US012166279B2

(12) United States Patent
Ryu et al.

(10) Patent No.: US 12,166,279 B2
(45) Date of Patent: Dec. 10, 2024

(54) ELECTRONIC DEVICE HAVING ANTENNA

(71) Applicant: LG ELECTRONICS INC., Seoul (KR)

(72) Inventors: Seungwoo Ryu, Seoul (KR); Joohee Lee, Seoul (KR); Junyoung Jung, Seoul (KR)

(73) Assignee: LG ELECTRONICS INC., Seoul (KR)

(*) Notice: Subject to any disclaimer, the term of this patent is extended or adjusted under 35 U.S.C. 154(b) by 513 days.

(21) Appl. No.: 17/594,566

(22) PCT Filed: Sep. 9, 2019

(86) PCT No.: PCT/KR2019/011627
§ 371 (c)(1),
(2) Date: Oct. 22, 2021

(87) PCT Pub. No.: WO2021/049672
PCT Pub. Date: Mar. 18, 2021

(65) Prior Publication Data
US 2022/0209400 A1 Jun. 30, 2022

(51) Int. Cl.
*H01Q 1/38* (2006.01)
*H01Q 1/24* (2006.01)
(Continued)

(52) U.S. Cl.
CPC ............... *H01Q 1/38* (2013.01); *H01Q 1/241* (2013.01); *H01Q 1/32* (2013.01); *H01Q 9/0407* (2013.01)

(58) Field of Classification Search
CPC ............ H01Q 1/38; H01Q 1/241; H01Q 1/32; H01Q 9/0407; H01Q 1/243; H01Q 5/378; H01Q 9/045; H01Q 1/3275
See application file for complete search history.

(56) References Cited

U.S. PATENT DOCUMENTS

2008/0266181 A1 10/2008 Ying
2014/0320376 A1* 10/2014 Ozdemir ............. H01Q 9/0442 343/876
(Continued)

FOREIGN PATENT DOCUMENTS

JP H04322504 * 4/1991
KR 20120094934 8/2012
(Continued)

OTHER PUBLICATIONS

PCT International Application No. PCT/KR2019/011627, International Search Report dated Jun. 9, 2020, 4 pages.

*Primary Examiner* — Minh D A
(74) *Attorney, Agent, or Firm* — LEE, HONG, DEGERMAN, KANG & WAIMEY

(57) ABSTRACT

An electronic device having an antenna, according to the present invention, comprises a cone antenna comprising: a cone radiator which is provided between a first substrate and a second substrate, the upper part of which is connected to the first substrate and the lower part of which is connected to the second substrate, and which has an opening at the top thereof; a metal patch which is formed on the first substrate so as to be separated from the top opening; a second metal patch which is formed so as to be separated from the metal patch; and a shorting pin which is formed so as to electrically connect the second metal patch and a ground layer of the second substrate, thereby providing a cone antenna having a plurality of metal patches that operate in a wide frequency band from a low frequency band to a 5G sub 6 band.

18 Claims, 16 Drawing Sheets

(51) Int. Cl.
*H01Q 1/32* (2006.01)
*H01Q 9/04* (2006.01)

(56) References Cited

U.S. PATENT DOCUMENTS

2015/0357720 A1 12/2015 Chen et al.
2017/0346179 A1* 11/2017 Wu ...................... H01Q 25/001

FOREIGN PATENT DOCUMENTS

| | | | |
|---|---|---|---|
| KR | 101850061 | B1 * | 6/2018 |
| KR | 20190002710 | | 1/2019 |
| WO | 2015189471 | | 12/2015 |

* cited by examiner

ELECTRONIC DEVICE HAVING ANTENNA

CROSS-REFERENCE TO RELATED APPLICATIONS

This application is the National Stage filing under 35 U.S.C. 371 of International Application No. PCT/KR2019/011627, filed on Sep. 9, 2019, the contents of which is hereby incorporated by reference herein in its entirety.

TECHNICAL FIELD

The present disclosure relates to an electronic device having a wide-band antenna. More particularly, the present disclosure relates to an electronic device having a cone antenna operating from a low frequency band to a frequency band of 5 GHz.

BACKGROUND

Electronic devices may be divided into mobile/portable terminals and stationary terminals according to mobility. Also, the electronic device may be classified into handheld types and vehicle mount types according to whether or not a user can directly carry.

Functions of electronic devices are diversified. Examples of such functions include data and voice communications, capturing images and video via a camera, recording audio, playing music files via a speaker system, and displaying images and video on a display. Some mobile terminals include additional functionality which supports electronic game playing, while other terminals are configured as multimedia players. Specifically, in recent time, mobile terminals can receive broadcast and multicast signals to allow viewing of video or television programs As it becomes multifunctional, an electronic device can be allowed to capture still images or moving images, play music or video files, play games, receive broadcast and the like, so as to be implemented as an integrated multimedia player.

Efforts are ongoing to support and increase the functionality of electronic devices. Such efforts include software and hardware improvements, as well as changes and improvements in the structural components.

In addition to those attempts, the electronic devices provide various services in recent years by virtue of commercialization of wireless communication systems using an LTE communication technology. Also, it is expected that in the future, wireless communication systems using 5G communication technology will be commercialized to provide a variety of services. Meanwhile, some of LTE frequency bands may be allocated to provide 5G communication services.

In this regard, the electronic device may be configured to provide 5G communication services in various frequency bands. Recently, attempts have been made to provide 5G communication services using a Sub-6 band below a 6 GHz band. In the future, it is also expected to provide 5G communication services by using a millimeter wave (mmWave) band in addition to the Sub-6 band for faster data rate.

Accordingly, a broadband antenna operating in both the LTE frequency band and the 5G Sub-6 frequency band needs to be disposed in the electronic device. However, the broadband antenna such as the cone antenna has problems in that an overall antenna size thereof increases and a weight thereof increases.

Furthermore, the broadband antenna such as the cone antenna may be implemented in a three-dimensional structure compared to a planar antenna in the related art. Accordingly, there is a problem in that there is no specific arrangement structure for arranging the cone antenna having such a three-dimensional structure in an electronic device or vehicle.

In addition, even when the cone antenna operates in a wide band, there is a problem in that the characteristics of the antenna may be deteriorated in a low frequency band around 1 GHz or less than 1 GHz.

SUMMARY

An aspect of the present disclosure is to solve the above-mentioned problems and other problems. Furthermore, another aspect of the present disclosure is to provide an electronic device having a broadband antenna element operating from a low frequency band to a 5 GHz band.

Still another aspect of the present disclosure is to provide an electronic device or vehicle in which a radiator and a metal patch are optimally disposed to operate from a low frequency band to a 5 GHz band.

Yet still another aspect of the present disclosure is to provide an antenna structure in which a radiator and a metal patch are optimally disposed while minimizing an overall antenna size.

In order to achieve the foregoing or other objectives, an electronic device having an antenna according to the present disclosure is provided. The electronic device may include a cone antenna including a cone radiator provided between a first substrate and the second substrate, an upper part of which is connected to the first substrate, a lower part of which is connected to the second substrate, and provided with an aperture at the upper part; a metal patch disposed on the first substrate, and spaced apart from the upper aperture; a second metal patch spaced apart from the metal patch; and a shorting pin disposed to electrically connect the second metal patch and the ground layer of the second substrate, thereby having an advantage capable of providing the cone antenna having a plurality of metal patches operating in broad frequency band from a low frequency band to a 5G sub-6 band. Furthermore, the cone radiator operating from a low frequency band to a 5G sub-6 band may be optimally disposed with the plurality of metal patches and the shorting pin in an electronic device or vehicle to optimize antenna performance.

According to an embodiment, the cone radiator is configured to connect the first substrate and the second substrate spaced apart from the first substrate by a predetermined gap and provided with a ground layer. Meanwhile, the electronic device may further include a transceiver circuit connected to the cone radiator through a power feeder to control a signal to be radiated through the cone antenna.

According to an embodiment, the cone antenna may further include a plurality of outer rims configured to constitute the upper aperture of the cone antenna and to connect the cone antenna to the first substrate; and a plurality of fasteners configured to connect the outer rims and the first substrate.

According to an embodiment, the number of the plurality of outer rims and the number of the plurality of fasteners may be configured to be three or greater to form multi-resonance of the cone antenna in a low frequency band. Accordingly, according to the present disclosure, a cone antenna having improved bandwidth characteristics through multi-resonance in a low frequency band through a multi-wing structure integrally formed with a radiator may be provided.

According to an embodiment, the first metal patch and the second metal patch may be disposed in a state of being rotated by a predetermined angle with respect to the cone radiator to minimize an overall size of a hybrid cone antenna including the cone radiator, the first metal patch, and the second metal patch.

According to an embodiment, a separation angle between the plurality of outer rims with respect to the center of the cone radiator may be defined to be substantially the same as each other, and the number of the plurality of outer rims and the number of the plurality of fasteners may each be configured to be six. Accordingly, according to the present disclosure, a cone antenna having improved bandwidth characteristics through multi-resonance in a low frequency band through a multi-wing structure integrally formed with a radiator may be provided.

According to an embodiment, the metal patch and the second metal patch may be disposed on a bottom surface of the first substrate.

According to an embodiment, the electronic device may further include a stack patch and a second stack patch spaced apart from the stack patch on a front surface of the first substrate, wherein the stack patch and the second stack patch are each disposed in an upper region of the metal patch and the second metal patch. As a result, in addition, according to the present disclosure, metal patches with various shapes may be disposed around an upper aperture of the cone antenna, thereby having an advantage capable of providing a broadband antenna with an optimal structure according to the operating frequency and design conditions of the antenna. Furthermore, according to the present disclosure, metal patches with various shapes may be disposed around an upper aperture of the cone antenna, thereby having an advantage capable of providing a broadband antenna with an optimal structure according to the operating frequency and design conditions of the antenna.

According to an embodiment, the shorting pin may be defined as a single shorting pin vertically connected between the second metal patch and the second substrate, and a null of a radiation pattern of the cone antenna may be prevented from being generated by the single shorting pin.

According to an embodiment, the shorting pin may be a single shorting pin disposed to vertically connect the second metal patch, the second stack patch disposed at an upper part of the second metal patch, and the second substrate, and a null of a radiation pattern of the cone antenna may be prevented from being generated by the single shorting pin. As a result, according to the present disclosure, a region where the metal patch is disposed in an upper region of the cone antenna and the number of shorting pins may be optimized, thereby having an advantage capable of optimizing the characteristics of the antenna as well as minimizing the overall size of the antenna.

According to an embodiment, the electronic device may further include the power feeder disposed on the second substrate, and configured to transmit the signal through a lower aperture, wherein an end portion of the power feeder is defined in a ring shape to correspond to a shape of the lower aperture.

According to an embodiment, the electronic device may further include a fastener configured to be connected to the second substrate through an inside of the end portion of the power feeder, wherein the second substrate on which the power feeder is disposed and the cone radiator are fixed through the fastener.

According to an embodiment, a dielectric region or slot region having a diameter greater than that of the upper opening may be provided inside the metal patch. In this case, the slot region may be disposed to surround the upper opening of the cone radiator so as to allow an electric field from the upper aperture of the cone radiator to be coupled to an inner side of the metal patch.

According to an embodiment, the electronic device may further include a stack patch and a second stack patch spaced apart from the stack patch on a front surface of the first substrate, wherein a dielectric region or a second slot region having a diameter greater than that of the upper opening is provided inside the stack patch.

According to an embodiment, the electronic device may further include at least one non-metal supporter configured to vertically connect the first substrate and the second substrate so as to support the first substrate and the second substrate, According to an embodiment, at least one of the non-metal supporters may be disposed to connect the metal patch and the second substrate, another one of the non-metal supporters may be disposed to connect the second metal patch and the second substrate, and a null of a radiation pattern of the cone antenna may be prevented from being generated by a single shorting pin disposed on the second metal patch.

According to an embodiment, the metal patch may be disposed as a rectangular patch having an outer side shape in a rectangular form, and an inner side shape of the rectangular patch may be defined in a circular shape to correspond to a shape of an outer line of the upper aperture so as to allow a signal radiated from the cone antenna to be coupled through an inner side of the rectangular patch.

A vehicle having an antenna according to another aspect of the present disclosure is provided. The vehicle may include a cone antenna including a cone radiator disposed to connect a first substrate and a second substrate spaced apart from the first substrate by a predetermined gap, and provided with an upper aperture and a lower aperture; a metal patch disposed on the first substrate, and spaced apart from the upper aperture; and a power feeder disposed on the second substrate, and configured to transmit a signal through the lower aperture. Furthermore, the vehicle may include a transceiver circuit connected to the cone radiator through the power feeder to control a signal to be radiated through the cone antenna.

According to an embodiment, the cone antenna may be implemented with a plurality of cone antennas disposed on an upper left, an upper right, a lower left and a lower right of the vehicle. Meanwhile, the vehicle may include a processor that controls an operation of the transceiver circuit, and the processor may control the transceiver to perform multi-input multi-output (MIMO) through the plurality of cone antennas.

According to an embodiment, the vehicle may further include a shorting pin that connects between the second metal patch and a ground layer of the second substrate, wherein an end portion of the power feeder is defined in a ring shape to correspond to a shape of the lower aperture.

According to an embodiment, the shorting pin may be defined as a single shorting pin between the second metal patch and the second substrate, and a null of a radiation pattern of the cone antenna may be prevented from being generated by the single shorting pin.

According to an embodiment, the vehicle may further include a fastener configured to be connected to the second substrate through an inside of the end portion of the power feeder, wherein the second substrate on which the power feeder is disposed and the cone radiator are fixed through the fastener.

According to an embodiment, the metal patch may be disposed only at one side so as to surround a partial region of an upper opening of the cone antenna to minimize a size of the cone antenna including the metal patch.

According to the present disclosure, there is an advantage capable of providing a cone antenna having a plurality of metal patches operating in a wide frequency band from a low frequency band to a 5G sub-6 band.

Furthermore, according to the present disclosure, a cone radiator operating from a low frequency band to a 5G sub-6 band is optimally disposed with a plurality of metal patches and shorting pins in an electronic device or vehicle, thereby having an advantage capable of optimizing antenna performance.

In addition, according to the present disclosure, there is an advantage capable of providing an electronic device or vehicle that operates in a wide band from a low frequency band to a 5 GHz band through a structure in which the cone radiator is connected to the metal patches and coupled between the plurality of metal patches.

Moreover, according to the present disclosure, the metal patches may rotate by a predetermined angle with respect to the cone radiator while the cone radiator and the metal patches are optimally disposed, thereby minimizing an overall antenna size.

Furthermore, according to the present disclosure, metal patches with various shapes may be disposed around an upper aperture of the cone antenna, thereby having an advantage capable of providing a broadband antenna with an optimal structure according to the operating frequency and design conditions of the antenna.

Furthermore, according to the present disclosure, a region where the metal patch is disposed in an upper region of the cone antenna and the number of shorting pins may be optimized, thereby having an advantage capable of optimizing the characteristics of the antenna as well as minimizing the overall size of the antenna.

Further scope of applicability of the present disclosure will become apparent from the following detailed description. It should be understood, however, that the detailed description and specific examples, such as the preferred embodiment of the disclosure, are given by way of illustration only, since various changes and modifications within the spirit and scope of the disclosure will be apparent to those skilled in the art.

BRIEF DESCRIPTION OF THE DRAWINGS

Referring to FIGS. 1A to 1C.

DETAILED DESCRIPTION

Figure 1A:
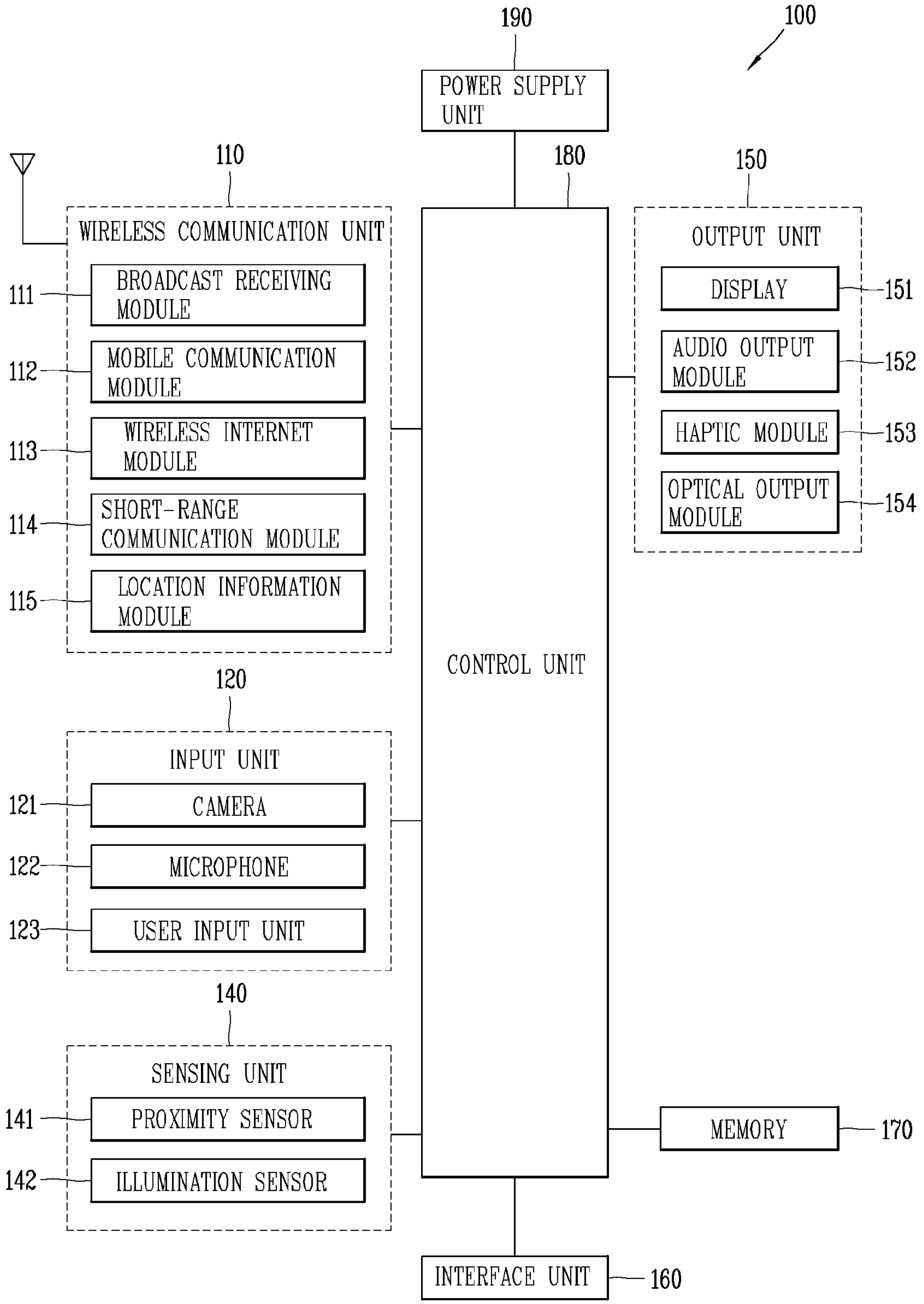
FIG. 1A is a block diagram of an electronic device in accordance with one exemplary implementation of the present disclosure.

Hereinafter, preferred embodiments of the present disclosure will be described in detail with reference to the accompanying drawings, and the same or similar elements are designated with the same numeral references regardless of the numerals in the drawings and redundant description thereof will be omitted. In general, a suffix such as “module” and “unit” may be used to refer to elements or components. Use of such a suffix herein is merely intended to facilitate description of the specification, and the suffix itself is not intended to give any special meaning or function. In describing the present disclosure, moreover, the detailed description will be omitted when a specific description for publicly known technologies to which the invention pertains is judged to obscure the gist of the present disclosure. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, user equipment, laptop computers, digital broadcast terminals, personal digital assistants (PDAs), portable multimedia players (PMPs), navigators, portable computers (PCs), slate PCs, tablet PCs, ultra-books, wearable devices (for example, smart watches, smart glasses, head mounted displays (HMOs)), and the like.

However, it may be easily understood by those skilled in the art that the configuration according to the exemplary embodiments of this specification can also be applied to stationary terminals such as digital TV, desktop computers, digital signages, and the like, excluding a case of being applicable only to the mobile terminals.

Figure 1B:
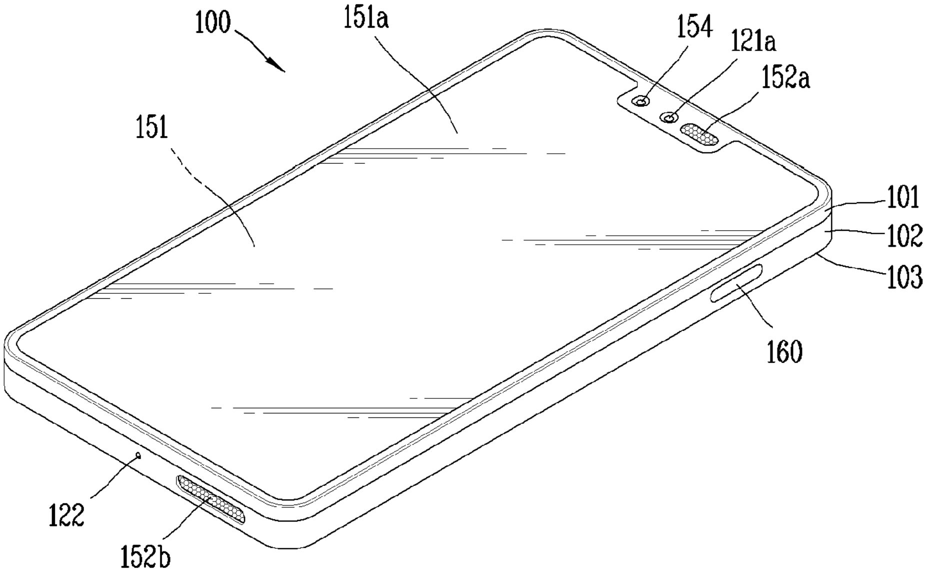
FIGS. 1B and 1C are conceptual views illustrating one example of an electronic device, viewed from different directions.
Figure 1C:
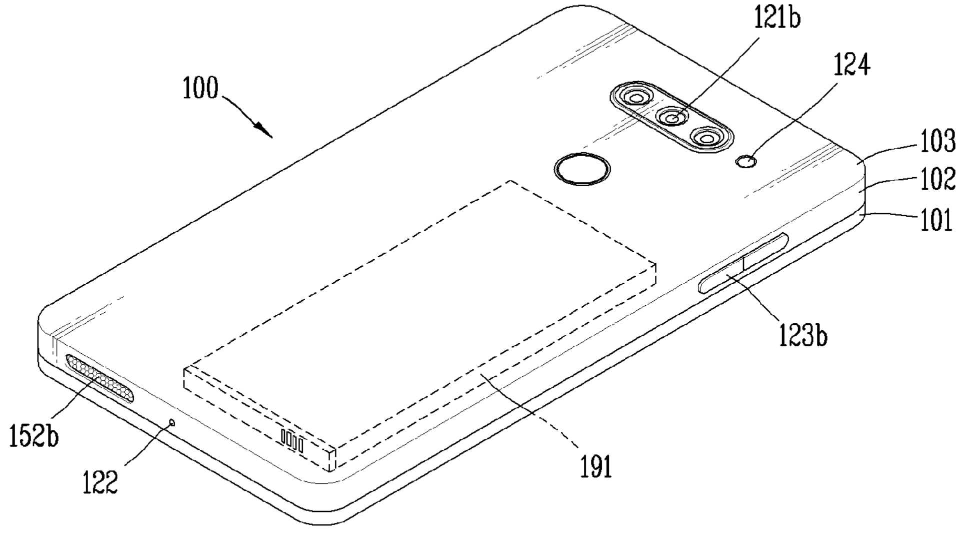

Referring to FIGS. 1A to 1C, FIG. 1A is a block diagram of an electronic device in accordance with one exemplary implementation of the present disclosure, and FIGS. 1B and 1C are conceptual views illustrating one example of an electronic device, viewed from different directions.

The electronic device 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement. Greater or fewer components may alternatively be implemented.

In more detail, among others, the wireless communication unit 110 may typically include one or more modules which permit communications such as wireless communications between the electronic device 100 and a wireless communication system, communications between the electronic device 100 and another electronic device, or communications between the electronic device 100 and an external server. Further, the wireless communication unit 110 may typically include one or more modules which connect the electronic device 100 to one or more networks. Here, the one or more networks may be, for instance, a 4G communication network and a 5G communication network.

The wireless communication unit 110 may include at least one of a 4G wireless communication module 111, a 5G wireless communication module 112, a short-range communication module 113, a location information module 114 and the like.

The 4G wireless communication module 111 may transmit and receive 4G signals to and from 4G base stations through a 4G mobile communication network. At this time, the 4G wireless communication module 111 may transmit one or more 4G transmission signals to the 4G base station. Furthermore, the 4G wireless communication module 111 may receive one or more 4G reception signals from the 4G base station.

In this regard, up-link (UL) multi-input multi-output (MIMO) may be performed by a plurality of 4G transmission signals transmitted to the 4G base station. Furthermore, down-link (DL) multi-input multi-output (MIMO) may be performed by a plurality of 4G reception signals received from the 4G base station.

The 5G wireless communication module 112 may transmit and receive 5G signals to and from 5G base stations through a 5G mobile communication network. Here, the 4G base station and the 5G base station may have a non-standalone (NSA) structure. For instance, the 4G base station and the 5G base station may have a co-located structure disposed at the same location within a cell. Alternatively, the 5G base station may be deployed in a stand-alone (SA) structure at a separate location from the 4G base station.

The 5G wireless communication module 112 may transmit and receive 5G signals to and from 5G base stations through a 5G mobile communication network. At this time, the 5G wireless communication module 112 may transmit one or more 5G transmission signals to the 5G base station. Furthermore, the 5G wireless communication module 112 may receive one or more 5G reception signals from the 5G base station.

In this case, a 5G frequency band may use the same band as a 4G frequency band, and it may be referred to as LTE re-farming. Meanwhile, a Sub-6 frequency band, which is a range of 6 GHz or less, may be used as the 5G frequency band.

On the contrary, a millimeter wave (mmWave) band may be used as a 5G frequency band to perform broadband high-speed communication. When the mmWave band is used, the electronic device 100 may perform beam forming for communication coverage expansion with a base station.

Meanwhile, regardless of the 5G frequency band, in a 5G communication system, a larger number of multi-input multi-output (MIMO) may be supported to improve transmission speed. In this instance, UL MIMO may be performed by a plurality of 5G transmission signals transmitted to a 5G base station. In addition, DL MIMO may be performed by a plurality of 5G reception signals received from the 5G base station.

Meanwhile, the wireless communication unit 110 may be in a dual connectivity (DC) state with a 4G base station and a 5G base station through the 4G wireless communication module 111 and the 5G wireless communication module 112. As such, the dual connectivity with the 4G base station and the 5G base station may be referred to as EUTRAN NR DC (EN-DC). Here, EUTRAN is an abbreviated form of "Evolved Universal Telecommunication Radio Access Network", and refers to a 4G wireless communication system. Also, NR is an abbreviated form of "New Radio" and refers to a 5G wireless communication system.

On the other hand, when the 4G base station and the 5G base station have a co-located structure, it is possible to improve throughput through inter-CA (Carrier Aggregation). Therefore, in an EN-DC state with the 4G base station and the 5G base station, 4G reception signals and 5G reception signals may be simultaneously received through the 4G wireless communication module 111 and the 5G wireless communication module 112.

The short-range communication module 113 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the electronic device 100 and a wireless communication system, communications between the electronic device 100 and another electronic device, or communications between the electronic device and a network where another electronic device (or an external server) is located, via wireless area networks. The short-range communication module denotes a module for short-range communications.

Meanwhile, short-range communication between electronic devices may be performed using the 4G wireless communication module 111 and the 5G wireless communication module 112. In one implementation, short-range communication may be performed between electronic devices in a device-to-device (D2D) manner without passing through base stations.

Meanwhile, for transmission speed improvement and communication system convergence, carrier aggregation (CA) using at least one of the 4G wireless communication module 111 and 5G wireless communication module 112 and the Wi-Fi communication module 113. In this regard, 4G+WiFi carrier aggregation (CA) may be performed using the 4G wireless communication module 111 and the Wi-Fi communication module 113. Alternatively, 5G+WiFi carrier aggregation (CA) may be performed using the 5G wireless communication module 112 and the Wi-Fi communication module 113.

The location information module 114 is generally configured to detect, calculate, derive or otherwise identify a position (or current position) of the electronic device. As an example, the location information module 115 includes a Global Position System (GPS) module, a Wi-Fi module, or both. For example, when the electronic device uses a GPS module, a position of the electronic device may be acquired using a signal sent from a GPS satellite. As another example, when the electronic device uses the Wi-Fi module, a position of the electronic device can be acquired based on information related to a wireless access point (AP) which transmits or receives a wireless signal to or from the Wi-Fi module. If desired, the location information module 114 may alternatively or additionally function with any of the other modules of the wireless communication unit 110 to obtain data related to the position of the electronic device. The location information module 114 is a module used for acquiring the position (or the current position) of the electronic device and may not be limited to a module for directly calculating or acquiring the position of the electronic device.

Specifically, when the electronic device utilizes the 5G wireless communication module 112, the position of the electronic device may be acquired based on information related to the 5G base station which performs radio signal transmission or reception with the 5G wireless communication module. In particular, since the 5G base station of the mmWave band is deployed in a small cell having a narrow coverage, it is advantageous to acquire the position of the electronic device.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensor unit 140 may typically be implemented using one or more sensors configured to sense internal information of the electronic device, the surrounding environment of the electronic device, user information, and the like. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). The electronic device disclosed herein may be configured to utilize information obtained from one or more sensors, and combinations thereof.

The output unit 150 may be configured to output an audio signal, a video signal or a tactile signal. The output unit 150 may include a display 151, an audio output module 152, a haptic module 153, an optical output unit 154 and the like. The display 151 may have an inter-layered structure or an integrated structure with a touch sensor in order to implement a touch screen. The touch screen may function as the user input unit 123 which provides an input interface between the electronic device 100 and the user and simultaneously provide an output interface between the electronic device 100 and a user.

The interface unit 160 serves as an interface with various types of external devices that are coupled to the electronic device 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. In some cases, the electronic device 100 may perform assorted control functions associated with a connected external device, in response to the external device being connected to the interface unit 160.

The memory 170 is typically implemented to store data to support various functions or features of the electronic device 100. For instance, the memory 170 may be configured to store application programs executed in the electronic device 100, data or instructions for operations of the electronic device 100, and the like. At least some of those application programs may be downloaded from an external server via wireless communication. Other application programs may be installed within the electronic device 100 at the time of manufacturing or shipping, which is typically the case for basic functions of the electronic device 100 (for example, receiving a call, placing a call, receiving a message, sending a message, and the like). It is common for application programs to be stored in the memory 170, installed in the electronic device 100, and executed by the controller 180 to perform an operation (or function) for the electronic device 100.

The controller 180 typically functions to control an overall operation of the electronic device 100, in addition to the operations associated with the application programs. The controller 180 may provide or process information or functions appropriate for a user in a manner of processing signals, data, information and the like, which are input or output by the aforementioned components, or activating the application programs stored in the memory 170.

Also, the controller 180 may control at least some of the components illustrated in FIG. 1A, to execute an application program that have been stored in the memory 170. In addition, the controller 180 may control a combination of at least two of those components included in the electronic device 100 to activate the application program.

The power supply unit 190 may be configured to receive external power or provide internal power in order to supply appropriate power required for operating elements and components included in the electronic device 100, under the control of the controller 180. The power supply unit 190 may include a battery, and the battery may be configured to be embedded in the terminal body, or configured to be detachable from the terminal body.

At least part of the components may cooperatively operate to implement an operation, a control or a control method of an electronic device according to various implementations disclosed herein. Also, the operation, the control or the control method of the electronic device may be implemented on the electronic device by an activation of at least one application program stored in the memory 170.

Referring to FIGS. 1B and 1C, the disclosed electronic device 100 includes a bar-like terminal body. However, the present disclosure may not be necessarily limited to this, and may be also applicable to various structures such as a watch type, a clip type, a glasses type, a folder type in which two or more bodies are coupled to each other in a relatively movable manner, a slide type, a swing type, a swivel type, and the like. Discussion herein will often relate to a particular type of electronic device. However, such teachings with regard to a particular type of electronic device will generally be applied to other types of electronic devices as well.

Here, considering the electronic device 100 as at least one assembly, the terminal body may be understood as a conception referring to the assembly.

The electronic device 100 will generally include a case (for example, frame, housing, cover, and the like) forming the appearance of the terminal. In this implementation, the electronic device 100 may include a front case 101 and a rear case 102. Various electronic components may be incorporated into a space formed between the front case 101 and the rear case 102. At least one middle case may be additionally positioned between the front case 101 and the rear case 102.

A display 151 may be disposed on a front surface of the terminal body to output information. As illustrated, a window 151*a* of the display 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed. Meanwhile, part of a side surface of the rear case 102 may be implemented to operate as a radiator.

As illustrated, when the rear cover 103 is coupled to the rear case 102, a side surface of the rear case 102 may be partially exposed. In some cases, upon the coupling, the rear case 102 may also be completely shielded by the rear cover 103. On the other hand, the rear cover 103 may include an opening for externally exposing a camera 121*b* or an audio output module 152*b*.

The electronic device 100 may include a display 151, first and second audio output module 152*a* and 152*b*, a proximity sensor 141, an illumination sensor 142, an optical output module 154, first and second cameras 121*a* and 121*b*, first and second manipulation units 123*a* and 123*b*, a microphone 122, an interface unit 160, and the like.

The display 151 is generally configured to output information processed in the electronic device 100. For example, the display 151 may display execution screen information of an application program executing at the electronic device 100 or user interface (UI) and graphic user interface (GUI) information in response to the execution screen information.

The display 151 may be implemented using two display devices, according to the configuration type thereof. For instance, a plurality of the displays 151 may be arranged on one side, either spaced apart from each other, or these devices may be integrated, or these devices may be arranged on different surfaces.

The display 151 may include a touch sensor which senses a touch onto the display 151 so as to receive a control command in a touching manner. Accordingly, when a touch is applied to the display 151, the touch sensor may sense the touch, and a controller 180 may generate a control command corresponding to the touch. The content which is input in the touching manner may be a text or numerical value, or a menu item which can be indicated or designated in various modes.

In this manner, the display 151 may form a flexible touch screen along with the touch sensor, and in this case, the touch screen may function as the user input unit 123 (refer to FIG. 1A). Therefore, the touch screen may replace at least part of the functions of the first manipulation unit 123*a*.

The first audio output module 152*a* may be implemented in the form of a receiver for transferring voice sounds to the user's ear or a loud speaker for outputting various alarm sounds or multimedia reproduction sounds.

The optical output module 154 may output light for indicating an event generation. Examples of the event generated in the electronic device 100 may include a message reception, a call signal reception, a missed call, an alarm, a schedule notice, an email reception, information reception through an application, and the like. When a user has checked a generated event, the controller 180 may control the optical output module 154 to stop the light output.

The first camera 121*a* may process video frames such as still or moving images acquired by the image sensor in a video call mode or a capture mode. The processed video frames may be displayed on the display 151, and stored in the memory 170.

The first and second manipulation units 123*a* and 123*b* are examples of the user input unit 123, which may be manipulated by a user to provide input to the electronic device 100. The first and second manipulation units 123*a* and 123*b* may also be commonly referred to as a manipulating portion. The first and second manipulation units 123*a* and 123*b* may employ any method if it is a tactile manner allowing the user to perform manipulation with a tactile feeling such as touch, push, scroll or the like. The first and second manipulation units 123*a* and 123*b* may also be manipulated through a proximity touch, a hovering touch, and the like, without a user's tactile feeling.

On the other hand, the electronic device 100 may include a finger scan sensor which scans a user's fingerprint. The controller 180 may use fingerprint information sensed by the finger scan sensor as an authentication means. The finger scan sensor may be installed in the display 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the electronic device 100 to interface with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the electronic device 100. The interface unit 160 may be implemented in the form of a socket for accommodating an external card, such as Subscriber Identification Module (SIM), User Identity Module (UIM), or a memory card for information storage.

The second camera 121*b* may be further mounted to the rear surface of the terminal body. The second camera 121*b* may have an image capturing direction, which is substantially opposite to the direction of the first camera unit 121*a*.

The second camera 121*b* may include a plurality of lenses arranged along at least one line. The plurality of lenses may be arranged in a matrix form. The cameras may be referred to as an 'array camera.' When the second camera 121*b* is implemented as the array camera, images may be captured in various manners using the plurality of lenses and images with better qualities may be obtained.

The flash 124 may be disposed adjacent to the second camera 121*b*. When an image of a subject is captured with the camera 121*b*, the flash 124 may illuminate the subject.

The second audio output module 152*b* may further be disposed on the terminal body. The second audio output module 152*b* may implement stereophonic sound functions in conjunction with the first audio output module 152*a*, and may be also used for implementing a speaker phone mode for call communication.

At least one antenna for wireless communication may be disposed on the terminal body. The antenna may be installed in the terminal body or implemented on the case. Meanwhile, a plurality of antennas connected to the 4G wireless communication module 111 and the 5G wireless communication module 112 may be arranged on a side surface of the terminal. Alternatively, an antenna may be formed in a form of film to be attached onto an inner surface of the rear cover 103 or a case including a conductive material may serve as an antenna.

Meanwhile, the plurality of antennas arranged on a side surface of the terminal may be implemented with four or more antennas to support MIMO. In addition, when the 5G wireless communication module 112 operates in a millimeter wave (mmWave) band, as each of the plurality of antennas is implemented as an array antenna, a plurality of array antennas may be arranged in the electronic device.

The terminal body is provided with a power supply unit 190 (see FIG. 1A) for supplying power to the electronic device 100. The power supply unit 190 may include a batter 191 which is mounted in the terminal body or detachably coupled to an outside of the terminal body.

Hereinafter, description will be given of implementations of a multi-transmission system and an electronic device having the same, specifically, a power amplifier in a heterogeneous radio system and an electronic device having the same according to the present disclosure, with reference to the accompanying drawings. It should be understood by those skilled in the art that the present disclosure can be embodied in other specific forms without departing from the concept and essential characteristics thereof.

Figure 2:
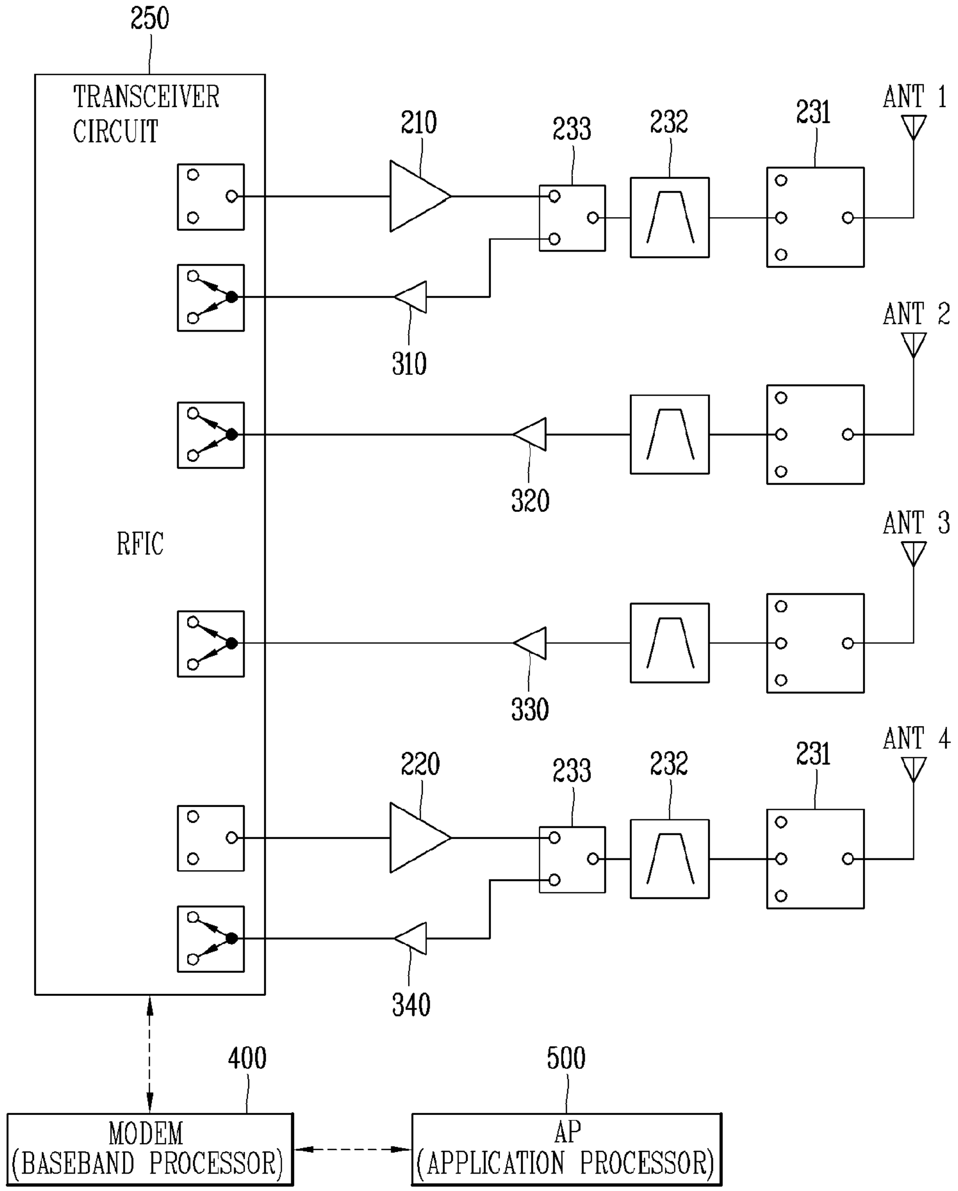
FIG. 2 is a block diagram illustrating a configuration of a wireless communication unit of an electronic device operable in a plurality of wireless communication systems according to an implementation.

FIG. 2 is a block diagram illustrating a configuration of a wireless communication unit of an electronic device operable in a plurality of wireless communication systems according to an implementation. Referring to FIG. 2, the electronic device includes a first power amplifier 210, a second power amplifier 220, and an RFIC 250. In addition, the electronic device may further include a modem 400 and an application processor (AP) 500. Here, the modem 400 and the application processor (AP) 500 may be physically implemented on a single chip, and may be implemented in a logical and functionally separated form. However, the present disclosure is not limited thereto and may be implemented in the form of a chip that is physically separated according to an application.

Meanwhile, the electronic device includes a plurality of low noise amplifiers (LNAs) 310 to 340 in the receiver. Here, the first power amplifier 210, the second power amplifier 220, the RFIC 250, and the plurality of low noise amplifiers 310 to 340 are all operable in a first communication system and a second communication system. In this case, the first communication system and the second communication system may be a 4G communication system and a 5G communication system, respectively.

As illustrated in FIG. 2, the RFIC 250 may be configured as a 4G/5G integrated type, but is not limited thereto, and may also be configured as a 4G/5G separation type according to an application. When the RFIC 250 is configured as a 4G/5G integrated type, it is advantageous in terms of synchronization between 4G/5G circuits, and also there is an advantage capable of simplifying control signaling by the modem 400.

On the other hand, when the RFIC 250 is configured as the 4G/5G separated type, the separated RFIDs may be referred to as 4G RFIC and 5G RFIC, respectively. In particular, when a band difference between the 5G band and the 4G band is large, such as when the 5G band is configured as a millimeter wave band, the RFIC 250 may be configured as a 4G/5G separation type. As such, when the RFIC 250 is configured as a 4G/5G separation type, there is an advantage that the RF characteristics can be optimized for each of the 4G band and the 5G band.

Meanwhile, even when the RFIC 250 is configured as a 4G/5G separation type, the 4G RFIC and the 5G RFIC may be logically and functionally separated but physically implemented on a single chip.

On the other hand, the application processor (AP) 500 is configured to control the operation of each component of the electronic device. Specifically, the application processor (AP) 500 may control the operation of each component of the electronic device through the modem 400.

For example, the modem 400 may be controlled through a power management IC (PMIC) for low power operation of the electronic device. Accordingly, the modem 400 may operate the power circuits of the transmitter and the receiver in a low power mode through the RFIC 250.

In this regard, when it is determined that the electronic device is in an idle mode, the application processor (AP) 500 may control the RFIC 250 through the modem 400 as follows. For example, when the electronic device is in an idle mode, the application processor 280 may control the RFIC 250 through the modem 400, such that at least one of the first and second power amplifiers 110 and 120 operates in the low power mode or is turned off.

According to another implementation, the application processor (AP) 500 may control the modem 400 to provide wireless communication capable of performing low power communication when the electronic device is in a low battery mode. For example, when the electronic device is connected to a plurality of entities among a 4G base station, a 5G base station, and an access point, the application processor (AP) 500 may control the modem 400 to enable wireless communication at the lowest power. Accordingly, the application processor (AP) 500 may control the modem 400 and the RFIC 250 to perform short-range communication using only the short-range communication module 113, even at the expense of throughput.

According to another implementation, when the remaining battery level of the electronic device is above the threshold, the modem 400 may be controlled to select an optimal wireless interface. For example, the application processor (AP) 500 may control the modem 400 to receive data through both the 4G base station and the 5G base station according to the remaining battery level and the available radio resource information. In this case, the application processor (AP) 500 may receive the remaining battery information from the PMIC, and the available radio resource information from the modem 400. Accordingly, when the remaining battery level and the available radio resources are sufficient, the application processor (AP) 500 may control the modem 400 and the RFIC 250 to receive data through both the 4G base station and 5G base station.

Meanwhile, a multi-transceiving system of FIG. 2 may integrate a transmitter and a receiver of each radio system into a single transceiver. Accordingly, there is an advantage in that a circuit portion for integrating two types of system signals may be eliminated at a RF front-end.

Furthermore, since the front end parts can be controlled by an integrated transceiver, the front end parts may be more efficiently integrated than when the transceiving system is separated by communication systems.

In addition, when separated by communication systems, it may be impossible to control other communication systems as required, or impossible to perform efficient resource allocation since system delay increases due to this. On the contrary, the multi-transceiving system as shown in FIG. 2 may control other communication systems as needed, thereby minimizing system delay due to this, and thus there is an advantage in that efficient resource allocation is possible.

Meanwhile, the first power amplifier 210 and the second power amplifier 220 may operate in at least one of the first and second communication systems. In this regard, when the 5G communication system operates in a 4G band or a sub-6 band, the first and second power amplifiers 1210 and 220 may operate in both the first and second communication systems.

On the contrary, when the 5G communication system operates in a millimeter wave (mmWave) band, the first and second power amplifiers 210, 220 may operate in either the 4G band and the other in the millimeter wave band.

On the other hand, a transmitter and a receiver may be integrated to implement two different wireless communication systems using a single antenna using a dual transmit/receive antenna. Here, 4×4 MIMO may be implemented using four antennas as shown in FIG. 2. In this case, 4×4 DL MIMO may be performed through downlink (DL).

Meanwhile, when the 5G band is a sub-6 band, first to fourth antennas (ANT 1 to ANT4) may be configured to operate in both the 4G band and the 5G band. On the contrary, when the 5G band is a millimeter wave (mmWave) band, the first to fourth antennas (ANT1 to ANT4) may be configured to operate in either one of the 4G band and the 5G band. In this case, when the 5G band is a millimeter wave (mmWave) band, a plurality of separate antennas may be individually configured as an array antenna in the millimeter wave band.

Meanwhile, 2×2 MIMO may be implemented using two antennas connected to the first power amplifier 210 and the second power amplifier 220 among four antennas. In this case, 2×2 UL MIMO (2 Tx) may be performed through uplink (UL). Alternatively, the present disclosure is not limited to 2×2 UL MIMO, and may also be implemented as 1 Tx or 4 Tx. In this case, when the 5G communication system is implemented with 1 Tx, only one of the first and second power amplifiers 210, 220 may operate in the 5G band. Meanwhile, when the 5G communication system is implemented with 4Tx, an additional power amplifier operating in the 5G band may be further provided. Alternatively, a transmission signal may be branched in each of one or two transmission paths, and the branched transmission signal may be connected to a plurality of antennas.

On the other hand, a switch-type splitter or power divider is integrated into the RFIC corresponding to the RFIC 250, and an additional component does not need to be disposed externally, thereby improving component mountability. In more detail, a single pole double throw (SPDT) type switch may be provided in the RFIC corresponding to the controller 250 to select transmitters (TXs) of two different communication systems.

Also, the electronic device operable in the plurality of wireless communication systems according to the present disclosure may further include a duplexer 231, a filter 232, and a switch 233.

The duplexer 231 is configured to separate signals in a transmission band and a reception band from each other. In this case, signals in a transmission band transmitted through the first and second power amplifiers 210, 220 are applied to the antennas (ANT1, ANT4) through a first output port of the duplexer 231. On the contrary, a signal in a reception band received through the antennas (ANT1, ANT4) are received by the low noise amplifiers 310, 340 through a second output port of the duplexer 231.

The filter 232 may be configured to pass signals in a transmission band or a reception band and block signals in the remaining bands. In this case, the filter 232 may include a transmission filter connected to the first output port of the duplexer 231 and a reception filter connected to the second output port of the duplexer 231. Alternatively, the filter 232 may be configured to pass only signals in the transmission band or only signals in the reception band according to a control signal.

The switch 233 is configured to transmit only one of the transmission signal and the reception signal. In an embodiment of the present disclosure, the switch 233 may be configured in a single-pole double-throw (SPDT) type to separate a transmission signal and a reception signal in a time division duplex (TDD) scheme. Here, the transmission signal and the reception signal are signals of the same frequency band, and thus the duplexer 231 may be implemented in the form of a circulator.

Meanwhile, in another embodiment of the present disclosure, the switch 233 may also be applicable to a frequency division duplex (FDD) scheme. In this case, the switch 233 may be configured in the form of a double-pole double-throw (DPDT) to connect or block a transmission signal and a reception signal, respectively. On the other hand, the transmission signal and the reception signal may be separated by the duplexer 231, and thus the switch 233 is not necessarily required.

Meanwhile, the electronic device according to an implementation may further include a modem 400 corresponding to the controller. In this case, the RFIC 250 and the modem 400 may be referred to as a first controller (or a first processor) and a second controller (a second processor), respectively. On the other hand, the RFIC 250 and the modem 400 may be implemented as physically separated circuits. Alternatively, the RFIC 250 and the modem 400 may be logically or functionally divided into a single circuit.

The modem 400 may perform control and signal processing for the transmission and reception of signals through different communication systems through the RFIC 250. The modem 400 may be acquired through control information received from the 4G base station and/or the 5G base station. Here, the control information may be received through a physical downlink control channel (PDCCH), but the present disclosure is not limited thereto.

The modem 400 may control the RFIC 250 to transmit and/or receive signals through the first communication system and/or the second communication system at specific time and frequency resources. Accordingly, the RFIC 250 may control transmission circuits including the first and second power amplifiers 210, 220 to transmit 4G or 5G signals in a specific time interval. In addition, the RFIC 250 may control reception circuits including first through fourth low-noise amplifiers 310 to 340 to receive 4G or 5G signals in a specific time interval.

On the other hand, a detailed operation and function of an electronic device having an array antenna operating in different bands according to the present disclosure provided with a multi-transceiving system as shown in FIG. 2 will be described below.

In a 5G communication system according to the present disclosure, a 5G frequency band may include a Sub-6 band and/or an LTE frequency band higher than the LTE frequency band. As such, a broadband antenna capable of supporting both the 4G communication system and the 5G communication system needs to be provided in the electronic device. In this regard, the present disclosure provides a broadband antenna (e.g., cone antenna) capable of operating from a low frequency band to about 5 GHz band.

Figure 3:
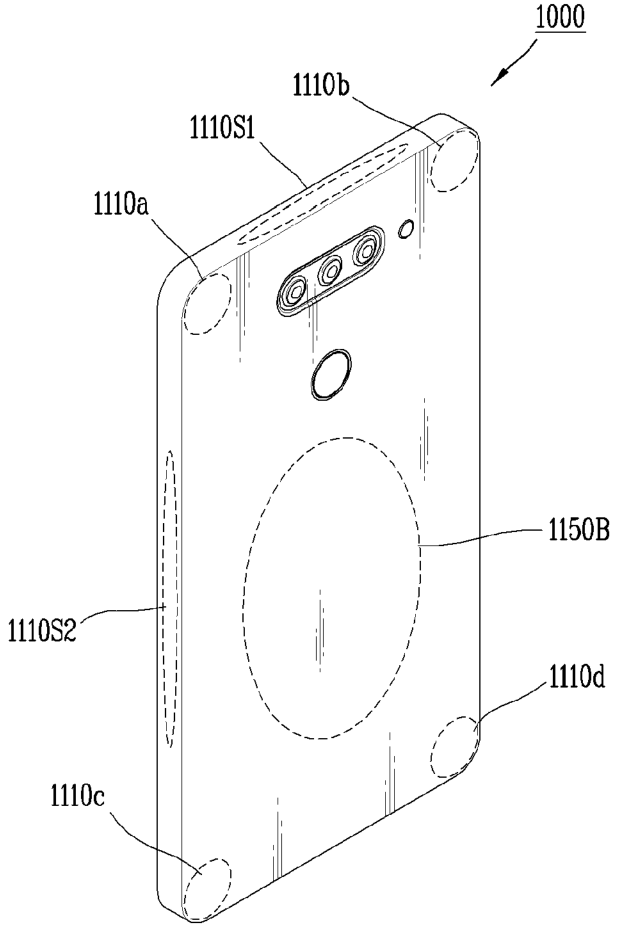
FIG. 3 is an example showing a configuration in which a plurality of antennas of an electronic device according to the present disclosure can be arranged.

FIG. 3 is an example showing a configuration in which a plurality of antennas of an electronic device according to the present disclosure can be arranged. Referring to FIG. 3, a plurality of antennas 1110*a* to 1110*d* or 1150B may be arranged on a rear surface of the electronic device 100. Alternatively, a plurality of antennas 1110S1 and 1110S2 may be disposed on a side surface of the electronic device 100. Here, the electronic device may be implemented in a communication relay apparatus, a small cell base station, a base station, or the like in addition to a user terminal (UE). Here, the communication relay apparatus may be customer premises equipment (CPE) capable of providing a 5G communication service indoors. In addition, a cone antenna according to the present disclosure may be mounted on a vehicle other than an electronic device to provide a 4G communication service and a 5G communication service.

On the other hand, referring to FIG. 2, a plurality of antennas (e.g., cone antennas) ANT 1 to ANT 4 may be arranged on a side surface or a rear surface of the electronic device 100.

Meanwhile, referring to FIGS. 2 and 3, at least one signal may be transmitted or received through the plurality of antennas 1110*a* to 1110*d* corresponding to the plurality of antennas ANT 1 to ANT 4. In this regard, each of the plurality of antennas 1110*a* to 1110*d* may be configured as a single cone antenna. The electronic device may communicate with a base station through any one of the plurality of cone antennas 1110*a* to 1110*d*. Alternatively, the electronic device may perform multi-input multi-output (MIMO) communication with the base station through two or more antennas among the plurality of cone antennas 1110*a* to 1110*d*.

Meanwhile, the present disclosure may transmit or receive at least one signal through the plurality of antennas 1110S1 and 1110S2 on a side surface of the electronic device 100. Unlike the drawings, at least one signal may be transmitted or received through the plurality of cone antennas 1110S1 to 1110S4 on a side surface of the electronic device 100. On the other hand, the electronic device may communicate with the base station through any one of the plurality of cone antennas 1110S1 to 1110S4. Alternatively, the electronic device may perform multi-input multi-output (MIMO) communication with the base station through two or more antennas among the plurality of cone antennas 1110S1 to 1110S4.

On the other hand, in the present disclosure, at least one signal may be transmitted or received through the plurality of cone antennas 1110*a* to 1110*d*, 1150B, and 1110S1 to 1110S4 on a rear surface and/or a side surface of the electronic device 100. Meanwhile, the electronic device may communicate with the base station through any one of the plurality of antennas 1110*a* to 1110*d*, 1150B, and 1110S1 to 1110S4. Alternatively, the electronic device may perform multi-input multi-output (MIMO) communication with the base station through two or more antennas among the plurality of antennas 1110*a* to 1110*d*, 1150B, and 1110S1 to 1110S4.

Hereinafter, an electronic device having a cone antenna according to the present disclosure will be described.

Figure 4A:
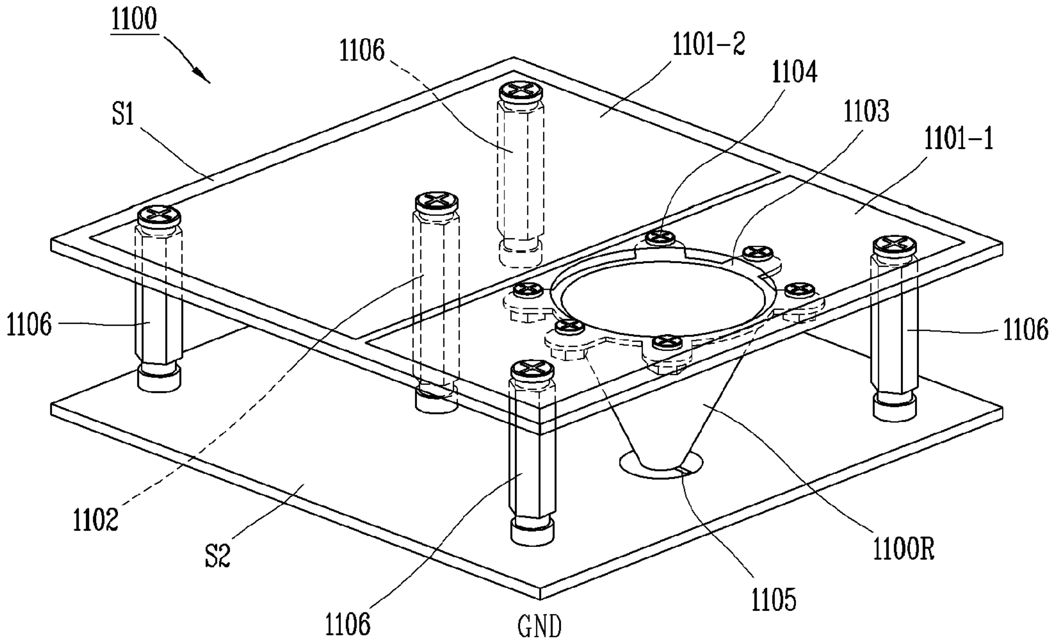
FIG. 4A is a perspective view showing a three-dimensional structure of a cone antenna according to the present disclosure. On the other hand.
Figure 4B:
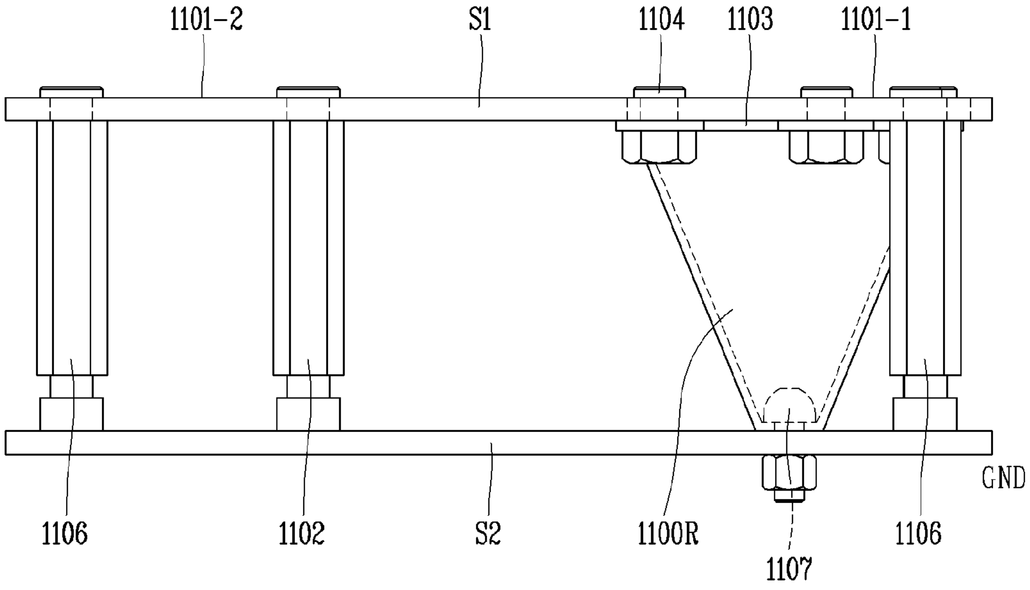
FIG. 4B is a side view showing a three-dimensional structure of the cone antenna according to the present disclosure.
Figure 5A:
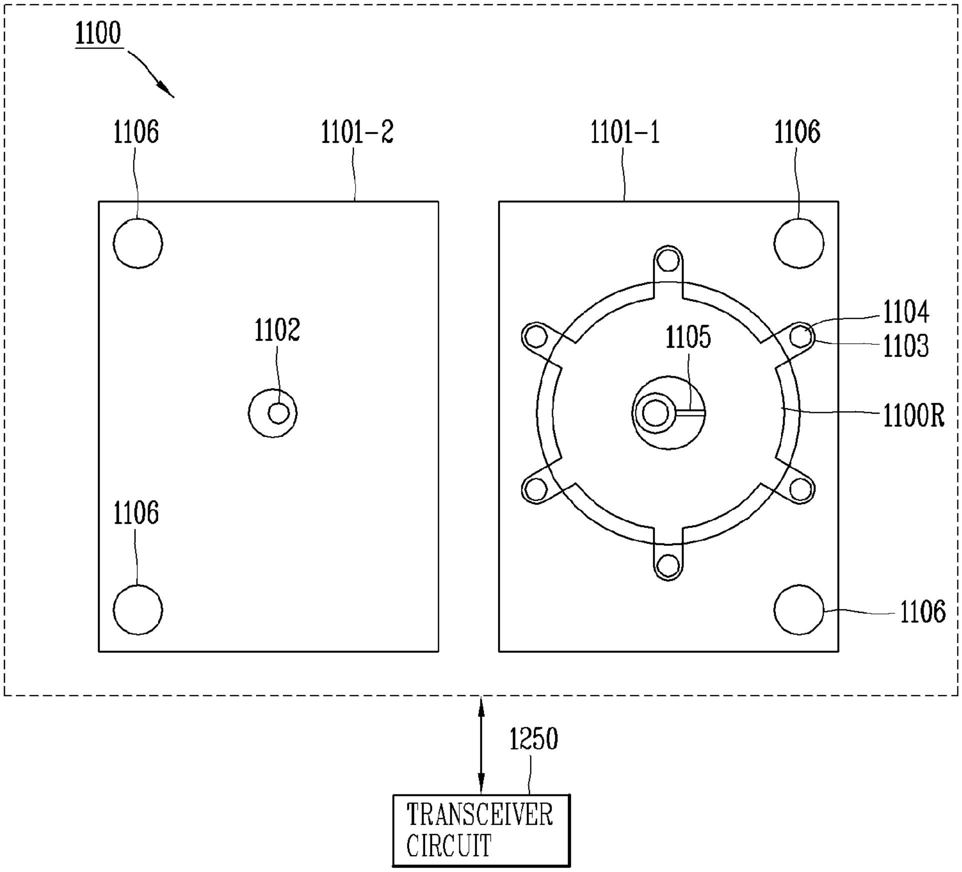
FIG. 5A shows a front view of a hybrid cone antenna having a plurality of metal patches according to the present disclosure.

In this regard, FIGS. 4A and 4B show a detailed structure of a broadband antenna (e.g., a cone antenna) capable of operating from a low frequency band to about 5 GHz band according to the present disclosure. Specifically, FIG. 4A shows a perspective view of a three-dimensional structure of a cone antenna according to the present disclosure. On the other hand, FIG. 4B shows a side view of a three-dimensional structure of the cone antenna according to the present disclosure. FIG. 5A shows a front view of a hybrid cone antenna having a plurality of metal patches according to the present disclosure.

Referring to FIGS. 4A to 5A, an electronic device or vehicle having an antenna according to the present disclosure includes a cone antenna 1100. Here, the cone antenna 1100 may include a metal patch 1101, a cone radiator 1100R, and a shorting pin 1102. In this case, the present disclosure is characterized in that the single cone radiator 1100R is provided in the metal patch 1101. Accordingly, an antenna structure provided with a single cone radiator as shown in the present disclosure may be referred to as a "single-cone antenna". On the contrary, an antenna structure provided with two or more cone radiators in the metal patch 1101 may be referred to as a "multi-cone antenna".

Meanwhile, the cone antenna 1100 according to the present disclosure may include one or more metal patches, that is, a first metal patch 1101-1 and a second metal patch 1101-2. Accordingly, a cone antenna according to the present disclosure, which is provided with the cone radiator 1100R and the shorting pins 1102, and provided with the metal patches 1101-1, 1101-2 configured to be electrically coupled to each other, is referred to as a "hybrid cone antenna with shorted patches". Here, the "hybrid cone antenna" refers to the first metal patch 1101-1 provided with the cone radiator 1100R. Accordingly, the "hybrid cone antenna with shorted patches" denotes that the first metal patch 1101-1 is configured to be electrically coupled to the second metal patch 1101-2 provided with the shorting pins 1102.

In this regard, the first metal patch 1101-1 provided with the cone radiator 1100R may operate to resonate in a first frequency band having an intermediate frequency band and a high frequency band. On the contrary, the second metal patch 1101-2 provided with the shorting pins 1102 may operate to resonate in a second frequency band having a low frequency band. However, the present disclosure is not limited thereto, and the first metal patch 1101-1 may operate in a high frequency band, and the second metal patch 1101-2 may operate in a low frequency band and an intermediate frequency band according to the application. Alternatively, the operating bands of the first metal patch 1101-1 and the second metal patch 1101-2 may overlap each other in some bands or the bandwidth may be extended by a combination thereof. Alternatively, the first metal patch 1101-1 and the second metal patch 1101-2 provided with the cone radiator 1100R and the shorting pins 1102 may operate as a single radiator.

Specifically, the cone antenna 1100 includes a first substrate S1 corresponding to an upper substrate, a second substrate S2 corresponding to a lower substrate, and the cone radiator 1100R. Here, the second substrate S2 may be spaced apart from the first substrate S1 by a predetermined gap, and may be provided with a ground layer GND. Furthermore, the cone antenna 1100 may further include the metal patches 1101-1, 1101-2, the shorting pins 1102, and a power feeder 1105.

Specifically, the cone radiator 1100R is provided between the first substrate S1 and the second substrate S2, the upper part is connected to the first substrate S1, the lower part is connected to the second substrate S2, and an upper aperture is provided at the upper part. Meanwhile, the first metal patch 1101-1 is disposed on the first substrate to be spaced apart from the upper aperture. Specifically, the shape of the first metal patch 1101-1 may be a rectangular patch having a rectangular outer shape so as to be coupled to the second metal patch 1101-2. Meanwhile, an inner shape of the first metal patch 1101-1 may be defined as a dielectric region 1120 having a circular shape so as to surround the upper aperture.

In this regard, an inner side shape of the first metal patch 1101-1 may be disposed in a circular shape to correspond to a shape of an outer line of the upper aperture. Through this, a signal radiated from the cone radiator 1100R may be coupled through an inner side of the metal patch 1101.

Meanwhile, the first metal patch 1101-1 may be disposed at both one side and the other side so as to surround an entire region of the upper opening of the cone radiator 1100R. Accordingly, the first metal patch 1101-1 of the first substrate S1 may be electrically connected to the cone radiator 1100R through a plurality of fasteners 1104 to a plurality of outer rims 1103. Accordingly, multi-resonance can be made through the plurality of outer rims 1103 and the plurality of fasteners 1104 connecting the first metal patch 1101-1 and the cone radiator 1100R, that is, a multi-wing structure.

More specifically, the number of the plurality of outer rims 1103 and the number of the plurality of fasteners 1104 may be three or greater, thereby forming multi-resonance of the cone antenna in a low frequency band. Accordingly, as the number of the plurality of wings increases, the low frequency characteristics of the cone antenna 1100 is improved.

Meanwhile, the shorting pins 1102 are disposed to electrically connect the second metal patch 1101-2 and the ground layer GND of the second substrate S2. On the other hand, the shorting pins 1102 may be implemented in a structure in which a fastener such as a screw having a predetermined diameter is inserted into a structure such as a dielectric.

Meanwhile, as described above, the cone antenna 1100 may further include the plurality of outer rims 1103 and the plurality of fasteners 1104 for allowing the cone antenna 1100 to be fixed to the first substrate S1 through the plurality of outer rims 1103. Specifically, the plurality of outer rims 1103 constitute an upper aperture of the cone radiator 1100R, and are configured to connect the cone radiator 1100R to the first substrate S1. Meanwhile, the plurality of fasteners 1104 are configured to connect the outer rims 1103 and the first substrate S1. In this regard, the cone radiator 1100R may be mechanically fastened to the first substrate S1 through the plurality of fasteners 1104 on a region facing the outer rims 1103, thereby improving bandwidth characteristics through multi-resonance in a low frequency band.

In more detail, a separation angle between the plurality of outer rims 1103 with respect to the center of the cone radiator 1100R may be defined to be substantially the same as each other. Accordingly, the cone radiator 1100R may be mechanically fastened to the first substrate S1 through the plurality of fasteners 1104 on the region facing the outer rims 1103, thereby improving bandwidth characteristics through multi-resonance in a low frequency band.

As an optimal case, the number of the plurality of outer rims 1103 and the number of the plurality of fasteners 1103 may each be six. Accordingly, the separation angle between the plurality of outer rims 1103 with respect to the center of the cone radiator 1100R may be defined to be substantially the same as each other, that is, 60 degrees to each other. Accordingly, the cone radiator 1100R may be optimally fastened to the first substrate S1 through the plurality of fasteners 1104 on the region facing the outer rims 1103, thereby optimally improving bandwidth characteristics through multi-resonance in a low frequency band.

Meanwhile, referring to FIG. 5A, an electronic device or vehicle according to the present disclosure further includes a transceiver circuit 1250 connected to the cone radiator 1100R through the power feeder 1105 to control a signal to be radiated through the cone antenna.

On the other hand, the bandwidth characteristics of the cone antenna 1100 may be further improved by electromagnetic coupling between the first metal patch 1101-1 and the second metal patch 1101-2 according to the present disclosure. In particular, a size of the metal patch is substantially increased to improve electrical characteristics in a low frequency band. Furthermore, bandwidth characteristics may be further improved through multi-resonance in a low frequency band through the plurality of outer rims 1103 integrally formed with the radiator 1100R and the plurality of fasteners 1104.

Meanwhile, with respect to electromagnetic coupling between the first metal patch 1101-1 and the second metal patch 1101-2, they may be disposed on the same layer. In addition, each of the first metal patch 1101-1 and the second metal patch 1101-2 may be disposed as a single patch or may be implemented as a stack patch structure.

Figure 5B:
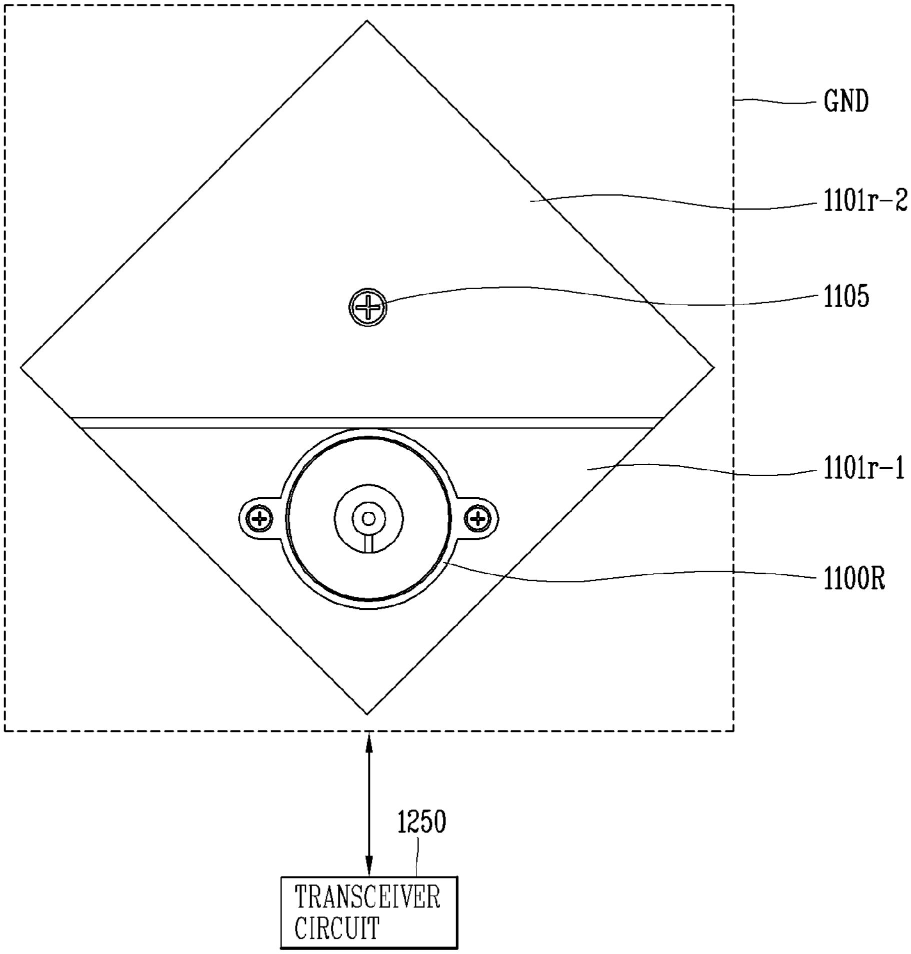
FIG. 5B shows a front view of a hybrid cone antenna having a plurality of metal patches according to another embodiment of the present disclosure.

On the other hand, FIG. 5B shows a front view of a hybrid cone antenna having a plurality of metal patches according to another embodiment of the present disclosure.

Referring to FIG. 5B, a first metal patch 1101*r*-1 and a second metal patch 1101*r*-2 may be disposed in a state of being rotated by a predetermined angle with respect to the cone radiator 1100R. For an example, the first metal patch 1101*r*-1 and the second metal patch 1101*r*-2 may be disposed in a state of being rotated by 45 degrees with respect to the cone radiator 1100R. In this case, a shorting pin 1105 may be connected to the ground GND through the second metal patch 1101*r*-2.

Accordingly, there is an advantage capable of minimizing an overall size of the hybrid cone antenna including the cone radiator 1100R, the first metal patch 1101*r*-1, and the second metal patch 1101*r*-2.

Figure 6:
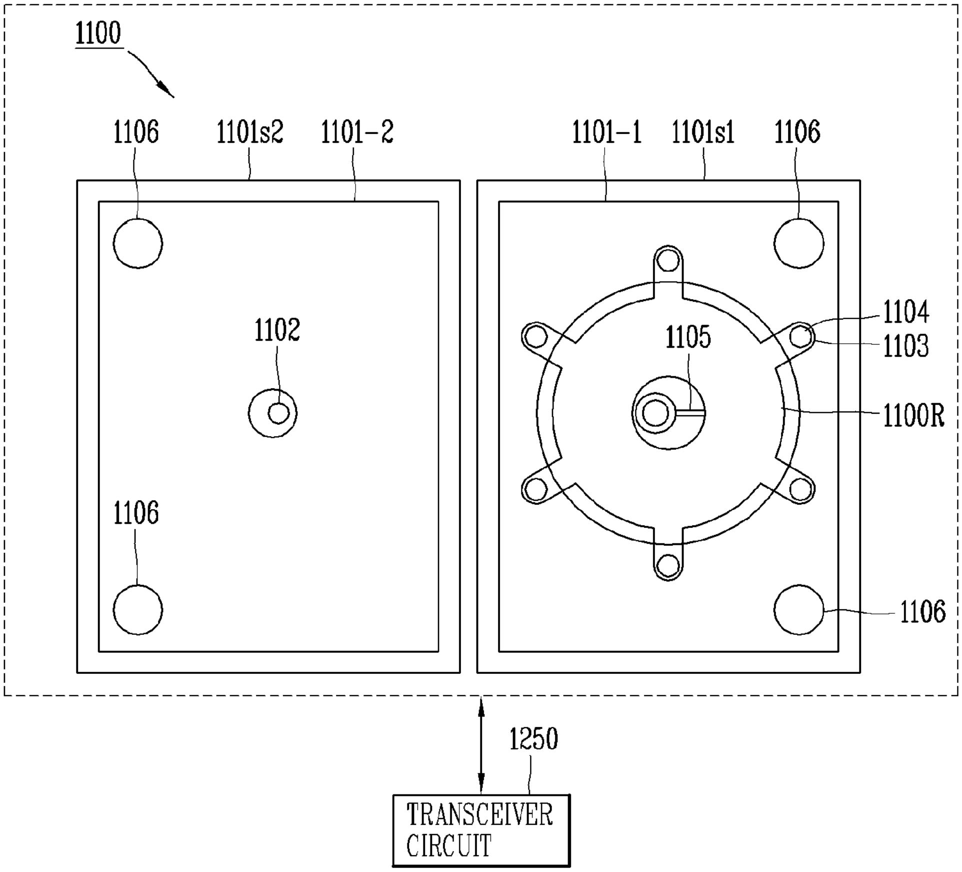
FIG. 6 shows a cone antenna in which first and second metal patches are disposed in a stack patch structure according to another embodiment of the present disclosure.

With respect to the above-described stack patch structure, FIG. 6 shows a cone antenna in which first and second metal patches are disposed in a stack patch structure according to another embodiment of the present disclosure. In this regard, the cone antenna 1100 includes a first substrate S1 corresponding to an upper substrate, a second substrate S2 corresponding to a lower substrate, and a cone radiator 1100R. Here, the second substrate S2 may be spaced apart from the first substrate S1 by a predetermined gap, and may be provided with a ground layer GND. Furthermore, the cone antenna 1100 may further include the metal patches 1101-1, 1101-2, stack patches 1101*s*-1, 1101*s*-2, the shorting pin 1102, and the power feeder 1105.

In this regard, the detailed descriptions of the cone radiator 1100R, the metal patches 1101-1, 1101-2, the shorting pin 1102, and the power feeder 1105 will be replaced with the description in FIG. 4A to FIG. 5. On the other hand, in order to improve bandwidth extension and antenna efficiency, the cone antenna 1100 having a stack patch structure according to the present disclosure further includes first and second stack patches 1101*s*-1, 1101*s*-2.

Specifically, the first stack patch 1101*s*-1 is disposed to correspond to the first metal patch 1101-1 on a front surface of the first substrate S1. Accordingly, the first metal patch 1101 may be disposed on a rear surface of the first substrate S1, and the first stack patch 1101*s*-1 may be disposed on a front surface of the first substrate S1 that is an upper part of the first metal patch 1101-1. However, the present disclosure is not limited thereto, and the first stack patch 1101*s*-1 may be disposed on a substrate disposed at a separate upper part thereof.

In addition, the second stack patch 1101*s*-2 is disposed to correspond to the second metal patch 1101-2 on a front surface of the first substrate S1. Accordingly, the second metal patch 1101-2 may be disposed on a rear surface of the first substrate S1, and the first stack patch 1101*s*-1 may be disposed on a front surface of the first substrate S1 that is an upper part of the second metal patch 1101-2. However, the present disclosure is not limited thereto, and the second stack patch 1101*s*-2 may be disposed on a substrate disposed at a separate upper part thereof.

Accordingly, in order to improve bandwidth extension and antenna efficiency, the cone antenna 1100 having a stack patch structure according to the present disclosure further includes the first stack patch 1101-1 and the second stack patch 1101-2. Furthermore, the cone antenna 1100 may further include the first stack patch 1101*s*-1 and the second stack patch 1101*s*-2 disposed in an upper region of the first metal patch 1101-1 and the second metal patch 1101-2. In other words, the cone antenna 1100 may further include the first stack patch 1101*s*-1 and the second stack patch 1101*s*-2 disposed to be spaced apart from the first stack patch 1101*s*-1 on the same plane as the first stack patch 1101*s*-1 on a front surface of the first substrate S1.

In this regard, in order to allow the cone radiator to be disposed at any one of the plurality of metal patches in an electronic device, the cone radiator needs to be implemented with a small size. For this purpose, the cone antenna structure according to the present disclosure may be referred to as a "cone with a shorting pin" or a "cone with a shorting supporter". In addition, in the present disclosure, since the cone antenna is coupled to the first metal patch and coupled again to the second metal patch, the structure may be referred to as a "hybrid cone antenna with a single shorting patch". Here, the "hybrid cone antenna" refers to the first metal patch 1101-1 provided with the cone radiator 1100R. Accordingly, the "hybrid cone antenna with shorted patches" denotes that the first metal patch 1101-1 is configured to be electrically coupled to the second metal patch 1101-2 provided with the shorting pins 1102.

In this regard, the number of shorting pins or shorting supporters may be one or two. Specifically, the number of shorting pins or shorting supports may not be limited thereto and may be changed according to applications. However, in the "cone with a shorting pin" or the "cone with a shorting supporter" according to the present disclosure, one or two shorting pins or shorting supporters may be implemented to reduce a size of the antenna.

Specifically, the shorting pin 1102 may be configured with a single shorting pin between the second metal patch 1101-2 and the second substrate S2. By such a single shorting pin 1102, a null of a radiation pattern of the cone antenna may be prevented from being generated. The operation principle and technical characteristics thereof will be described in detail with reference to FIGS. 10A and 10B.

In this regard, in a typical cone antenna, a null of the radiation pattern may be generated from boresight in an elevation angle direction, thereby deteriorating reception performance. In order to solve this problem, in the present disclosure, the null of the radiation pattern may be removed from boresight in an elevation angle direction through a structure in which the cone antenna 1100 is connected to a single shorting pin 1102. Accordingly, the present disclosure has an advantage in that reception performance can be improved in almost all directions.

In this regard, the cone antenna with a single shorting pin forms a current path of the power feeder 1105—the cone radiator 1100R—the first and second metal patches 1101-1, 1101-2—the shorting pin 1102—the ground layer GND. In this way, through an asymmetric current path of the power feeder 1105—the cone radiator 1100R—the first and second metal patches 1101-1, 1101-2—the shorting pin 1102—the ground layer GND, a null of the radiation pattern may be prevented from being generated from boresight in the elevation angle direction.

Furthermore, referring to FIG. 6, the shorting pin 1102 may be a single shorting pin disposed to vertically connect the second metal patch 1101-2, the second stack patch 1101*s*-2 disposed at an upper part of the second metal patch 1101-2, and the second substrate S2. As described above, a null of a radiation pattern of the cone antenna may be prevented from being generated by the single shorting pin 1102. In addition, an overall size of the cone antenna 1100 may be reduced by the single shorting pin 1102 configured to connect both the second metal patch 1101-2 and the second stack patch 1101*s*-2. Furthermore, the stack patch structure may be interconnected by the single shorting pin 1102 to increase an overall volume of the antenna, thereby improving antenna efficiency.

Furthermore, the cone antenna 1100 may further include a fastener 1107 that fastens non-metal supporters 1106 to the power feeder 1105. Specifically, the fastener 1107 is configured to be connected to the second substrate S2 through an inside of an end portion of the power feeder 110. Accordingly, the second substrate S2 on which the power feeder 1105 is disposed and the cone radiator 1100R is fixed through the fastener 1107. Here, the fasteners 1104 and 1107 may be implemented as fasteners such as screws having a predetermined diameter.

According to another embodiment, a hybrid cone antenna having a plurality of patches according to the present disclosure may be configured with a plurality of shorting pins, thereby implementing symmetry of electrical properties in various directions along with structural stability. In this regard, when a plurality of symmetrically shaped shorting pins are provided, the current distribution of the cone antenna having a multi-cone structure is symmetrically formed. Accordingly, there is an advantage in that mobility, in particular, symmetry of electrical characteristics in various directions can be maintained even when changing directions in an electronic device or vehicle provided with a cone antenna having a multi-cone structure. In this regard, when the plurality of shorting pins are symmetrically disposed, a null of the radiation pattern may be generated from boresight in the elevation angle direction. However, in the case of a vehicle, it is not important to transmit or receive a signal through boresight in the elevation angle direction. It will be described in detail below.

Alternatively, a hybrid cone antenna with a plurality of patches according to the present disclosure may be implemented with a single shorting pin and one or more non-metal supporters 1106. Accordingly, the transmission and/or reception of signals can be made even from boresight in the elevation angle direction along with structural stability due to the plurality of supporters. Due to such transmission and/or reception characteristics, a hybrid cone antenna having a single shorting pin and a plurality of patches may be used in an electronic device or a 5G communication apparatus, that is, 5G CPE.

Meanwhile, the power feeder 1105 is disposed on the second substrate S2 and configured to transmit a signal through a lower aperture. To this end, an end portion of the power feeder 1105 may be defined in a ring shape to correspond to a shape of the lower aperture.

As described above, a cone antenna according to the present disclosure may further include at least one non-metal supporter 1106 to mechanically fix the cone radiator 1100R to the first substrate S1 and the second substrate S2. To this end, the non-metal supporter 1106 is configured to vertically connect the first substrate S1 and the second substrate S2 to support the first substrate S1 and the second substrate S2. On the other hand, since the non-metal supporter 1106 is not a metal and is not electrically connected to the metal patch 1101, the electrical characteristics of the cone antenna 1100 are not affected. Accordingly, the non-metal supporter 1106 may be disposed on an upper left portion, an upper right portion, a lower left portion, and a lower right portion of the first and second substrates S1 and S2 to vertically connect and support the first and second substrates S1 and S2. However, the present disclosure is not limited thereto, and may be modified into various structures capable of supporting the first substrate S1 and the second substrate S2.

Specifically, at least one of the non-metal supporters 1106 is disposed to connect the metal patch 1101-1 and the second substrate S2 to each other. On the contrary, another one of the non-metal supporters 1106 may be disposed to connect the second metal patch 1101-2 and the second substrate S2. Accordingly, a null of a radiation pattern of the cone antenna may be prevented from being generated by the single shorting pin 1102 disposed at the second metal patch 1101-2.

Meanwhile, the outer rim 1103 may be integrally formed with the cone radiator 1100R, and may be connected to the first substrate S1 through the fasteners 1104. Here, the outer rim 1103 may be implemented as a plurality of outer rims, for instance, six outer rims at opposing points of the cone radiator 1100R.

On the other hand, the fastener 1107 may be configured to be connected to the second substrate S2 through an inside of an end portion (i.e., a ring shape) of the power feeder 1105. Accordingly, the second substrate S2 on which the power feeder 1105 is disposed and the cone radiator 1100R may be fixed through the fastener 1107. Accordingly, the fastener 1107 performs a role of fixing the cone radiator 1100R to the second substrate S2 as well as a role of a power feeder that transmits a signal to the cone radiator 1100R.

On the other hand, FIG. 5 shows a front view of a hybrid cone antenna having a plurality of metal patches according to the present disclosure as described above. The hybrid cone antenna 1100 having a plurality of metal patches in FIG. 5 may be referred to as a "hybrid cone antenna with shorted patches". In this regard, a single shorting pin may be disposed inside the second metal patch 1101-2. On the other hand, the structure is not limited thereto, and one or more shorting pins may be disposed inside the metal patch 1101.

Accordingly, the hybrid cone antenna 1100 having the plurality of metal patches according to the present disclosure in FIG. 5 has an advantage capable of operating in a wide frequency band according to the multi-wing structure together with the plurality of metal patches. Specifically, there is an advantage in that the hybrid cone antenna 1100 can operate in both first and second frequency bands, in particular, up to 5 GHz in a low frequency band. Accordingly, the hybrid cone antenna 1100 may operate in both bands of LTE and 5G sub-6 bands.

On the other hand, in the hybrid cone antenna 1100 having a plurality of metal patches according to the present disclosure, the first metal patch 1101-1 may be defined as a rectangular patch to be coupled to the second metal patch 1101-2 with a predetermined gap. In other words, the metal patch 1101-1 may be defined as a rectangular patch having an outer side shape in a rectangular form. However, the present disclosure is not limited thereto, and the first metal patch 1101-1 may be implemented as a rectangular patch or a metal patch having any polygonal structure depending on the application.

On the other hand, an inner side shape of the rectangular patch 1101-1 may be disposed in a circular shape to correspond to a shape of an outer line of the upper aperture. Accordingly, a signal radiated from the cone radiator 1100R of the cone antenna may be coupled through an inner side of the rectangular patch 1101-1.

Meanwhile, referring to FIGS. 4A to 5, the dielectric region 1120 of the rectangular patch 1101 may be disposed to surround the upper aperture. In other words, the dielectric region 1120 may be disposed to have a larger diameter than that of the upper opening inside the metal patch 1101. Accordingly, the cone radiator 1100R may be implemented such that the metal patches 1101 are disposed at both sides of the upper aperture.

Alternatively, the slot region 1120 may be disposed inside the metal patch 1101 to have a larger diameter than that of the upper opening. Here, the "slot region" refers to a structure in which a dielectric is removed in a circular shape having a larger diameter than that of the upper aperture on the first substrate S1, which is a dielectric substrate. Accordingly, since a substrate having a specific dielectric constant is not disposed at an upper part of the cone radiator 1100R, there is an advantage in that the radiation efficiency of the antenna can be improved. Meanwhile, part of a signal transmitted through the cone radiator 1100R is radiated through the upper opening of the cone radiator 1100R to generate resonance in a high frequency band.

However, the remaining part of the signal transmitted through the cone radiator 1100R is coupled to an inner side of the first metal patch 1101-1 to generate resonance in an intermediate frequency band by the first metal patch 1101-1. To this end, the dielectric region or slot region 1120 is disposed to surround the upper opening of the cone radiator 1100R. Accordingly, an electric field from the upper aperture of the cone radiator 1100R is coupled to an inner side of the first metal patch 1101-1.

Furthermore, the remaining part of the signal transmitted through the cone radiator 1100R is coupled to the second metal patch 1101-2 to generate resonance in a low frequency band by the second metal patch 1101-2. In addition, multi-resonance is generated in a low frequency band due to the multi-wing structure according to the plurality of outer rims 1103 and fasteners 1104 provided in the cone radiator 1100R to further extend the low frequency bandwidth.

On the other hand, referring to FIGS. 4A to 6, the electronic device or vehicle may further include a stack patch 1101*s*1 and a second stack patch 1101*s*2 disposed to be spaced apart from the stack patch 1101*s*1 on a front surface of the first substrate S1. In this regard, a dielectric region or a second slot region 1120-2 having a larger diameter than that of the upper opening may be further provided inside the stack patch 1101*s*1.

Figure 7A:
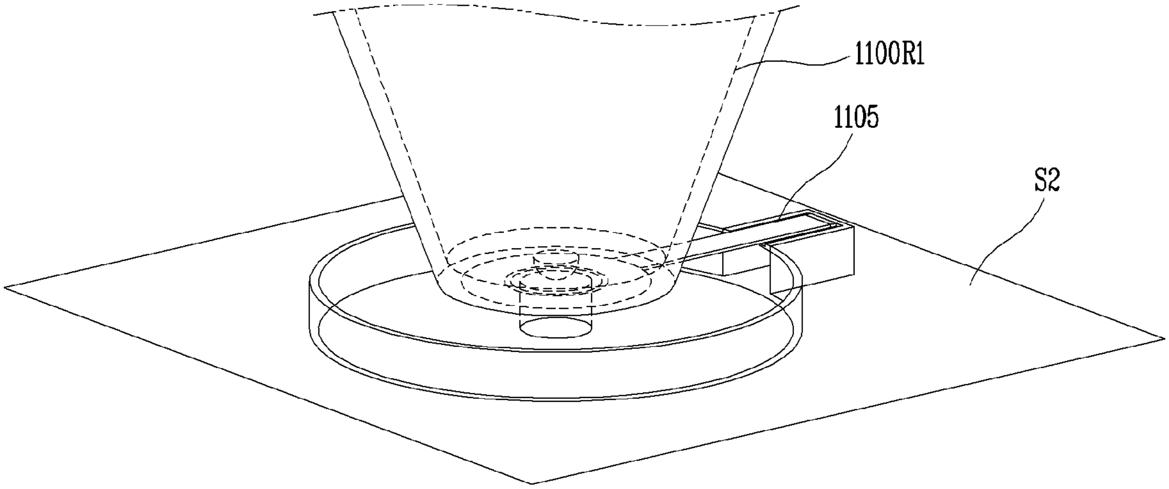
FIG. 7A shows a fastening structure between the cone antenna and a power feeder that feeds power to the cone antenna according to the present disclosure. On the contrary.

Meanwhile, in the hybrid cone antenna 1100 having a plurality of metal patches according to the present disclosure, the lower aperture may be connected to each power feeder. In this regard, FIG. 7A shows a fastening structure between the cone antenna and a power feeder that feeds power to the cone antenna according to the present disclosure. On the contrary, FIG. 7B shows a power feeder corresponding to a shape of the cone antenna, which feeds power to the cone antenna according to the present disclosure.

Figure 7B:
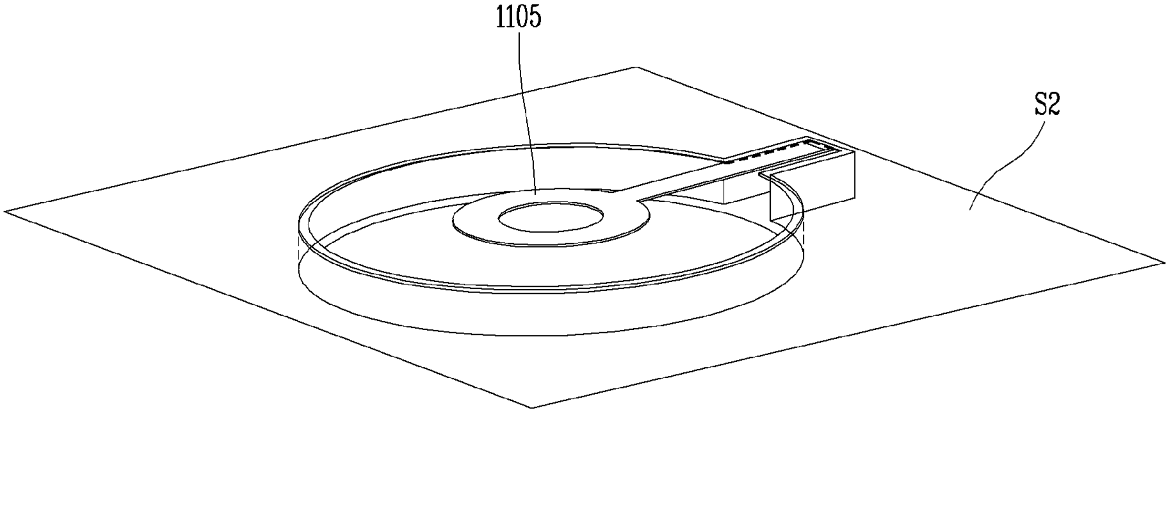
FIG. 7B shows a power feeder corresponding to a shape of the cone antenna, which feeds power to the cone antenna according to the present disclosure.

Referring to FIGS. 7A and 7B, the power feeder 1105 may be disposed on the second substrate, which is a lower substrate, in a shape corresponding to that of the cone radiator 1100R. Specifically, the power feeder 1105 is disposed on the second substrate S2, and configured to transmit a signal to the cone radiator 1100R through the lower aperture. In this regard, the power feeder 1105 may be disposed on the second substrate S2 to transmit a signal to the cone radiator 1100R through the lower aperture, thereby radiating the signal through the upper aperture and the metal patches 1101-1, 1101-2.

On the other hand, an end portion of the power feeder 1105 may be defined in a ring shape to correspond to a shape of the cone radiator 1100R. In other words, in the hybrid cone antenna 1100 having a plurality of metal patches according to the present disclosure, a stable feed contact structure between the lower aperture of the cone radiator 1100R1, 1100R2 and the power feeder through a ring-type pad structure may be implemented.

Accordingly, referring to FIG. 5, a transceiver circuit 1250 may be configured to be each connected to the cone radiator 1100R through the power feeder 1105. As a result, the transceiver circuit 1250 may control a first signal in a first frequency band to be radiated through the cone antenna 1100. In addition, the transceiver circuit 1250 may control a second signal in a second frequency band lower than the first frequency band to be radiated through the cone antenna 1100.

Meanwhile, in the hybrid cone antenna 1100 having a plurality of metal patches according to the present disclosure, the first metal patch 1101 may be defined as a rectangular patch. However, the present disclosure is not limited thereto, and the other side the metal patch 1101 may be implemented as a circular patch or a metal patch having any polygonal structure depending on the application.

Figure 8A:
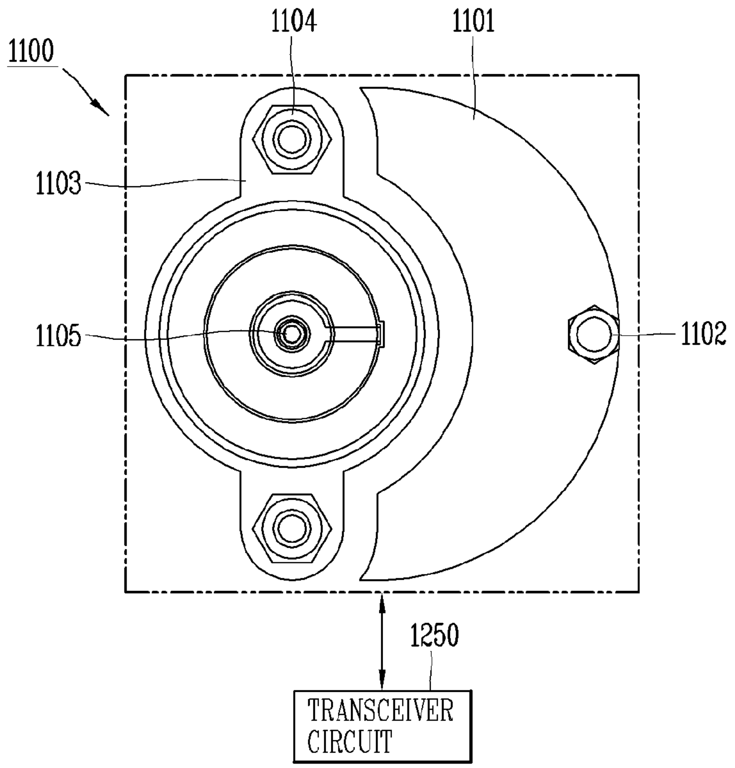
FIGS. 8A and 8B are front views showing a cone antenna having a structure of a cone with a single shorting pin according to various embodiments of the present disclosure.
Figure 8B:
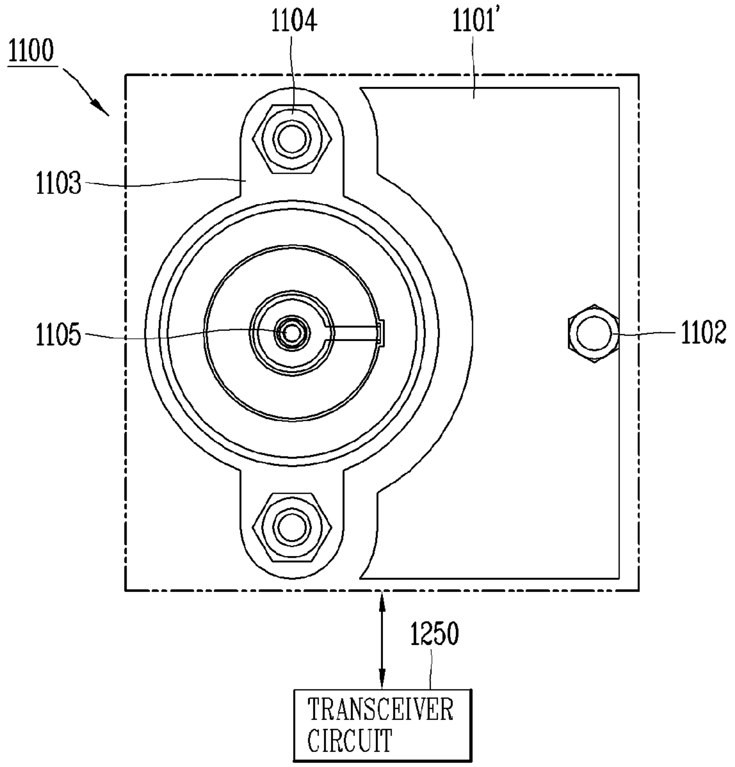

On the other hand, FIGS. 8A and 8B are front views showing a cone antenna having a structure of a cone with a single shorting pin according to various embodiments of the present disclosure. In other words, FIGS. 8A and 8B show a cone antenna implemented by one radiator with a single shorting pin. Here, when the metal patch 1101, 1101' is disposed only at one side of the cone radiator 1102 as shown in FIGS. 8A and 8B, the second metal patch 1101-2 may be disposed on the metal patch 1101, 1101' with a predetermined gap. In this regard, in the case of the circular patch 1101 in FIG. 8A, an inner side of the second metal patch 1101-2 may be defined in a circular shape to correspond thereto.

Meanwhile, a cone structure with a single shorting pin as shown in FIGS. 8A and 8B may be implemented by a single shorting pin (or a shorting supporter). Specifically, FIG. 8A shows a shape in which a metal patch having a circular shape is disposed on one side of an upper opening of the cone radiator. On the contrary, FIG. 8B shows a shape in which a rectangular metal patch is disposed on one side of the upper opening of the cone radiator. In this case, since the shorting pin 1102 is disposed on the metal patch 1101, 1101', the shorting pin may not be disposed on the second metal patch 1101-2. However, the present disclosure is not limited thereto, and shorting pins may be disposed on both the metal patches 1101 and 1101' and the second metal patch 1101-2. Alternatively, the shorting pin 1102 may not be disposed on the metal patch 1101, 1101', and a single shorting pin may be disposed on the second metal patch 1101-2.

Referring to FIGS. 8A and 8B, an electronic device according to the present disclosure includes the cone antenna 1100. Furthermore, the electronic device may further include a transceiver circuit 1250.

Meanwhile, referring to FIGS. 8A and 8B, the cone antenna 1100 is disposed between a first substrate, which is an upper substrate, and a second substrate, which is a lower substrate. On the other hand, the cone antenna 1100 may include metal patches 1101, 1101', 1101*a*, 1101*b*, and the shorting pin 1102. Here, the metal patch 1101 may be disposed in a surrounding region of one side of the upper aperture of the cone antenna 1100. In this regard, the metal patch 1101 may be disposed on the first substrate. Here, the cone antenna 1100 may refer to only a hollow cone antenna or refer to an entire antenna structure including the metal patch 1101.

Specifically, the metal patches 1101, 1101', 1101*a*, 1101*b* may be disposed in a surrounding region of the upper aperture of the cone antenna 1100, and disposed above the first substrate. Accordingly, the metal patch 1101 may be disposed at a position spaced apart from the upper aperture of the cone antenna 1100 in a z-axis by a thickness of the first substrate. As such, when the metal patch 1101 is disposed above the first substrate, there is an advantage in that a size of the cone antenna 1100 can be further reduced. Specifically, since the first substrate having a predetermined dielectric constant is disposed in an upper region of the cone antenna 1100 including the metal patch 1101, there is an advantage in that the size of the cone antenna 1100 can be further reduced.

Alternatively, the metal patches 1101, 1101', 1101*a*, 1101*b* may be disposed in a surrounding region of the upper aperture of the cone antenna 1100, and disposed below the first substrate. Accordingly, the metal patch 1101 may be spaced apart from the upper aperture of the cone antenna 1100 by a predetermined gap on the same plane on the z-axis. When the metal patch 1101 is disposed below the first substrate as described above, the first substrate may operate as a radome of the cone antenna 1100 including the metal patch 1101. Accordingly, there is an advantage in that the cone antenna 1100 including the metal patch 1101 can be protected from the outside and a gain of the cone antenna 1100 can be increased.

The shorting pin 1102 is configured to connect between the metal patch 1101, 1101', 1101*a*, 1101*b* and the ground layer GND disposed on the second substrate. As such, there is an advantage in that the size of the cone antenna 1100 can be reduced by the shorting pin 1102 configured to connect between the metal patch 1101 and the ground layer GND disposed on the second substrate. Meanwhile, the number of shorting pins 1102 may be one or two. A case where the number of shorting pins 1102 is one may be most advantageous in terms of reducing the size of the cone antenna 1100. Accordingly, the shorting pin 1102 may be configured with a single shorting pin between the metal patch and the second substrate, which is a lower substrate. However, the number of shorting pins may not be limited thereto, and two or more shorting pins may be used in terms of performance and structural stability of the cone antenna 1100. Depending on the application, some pins other than the shorting pin 1102 may be implemented as non-metal supporting pins in a non-metallic form.

The transceiver circuit 1250 may be connected to the cone radiator 1100R through the power feeder 1105, and may control a signal to be radiated through the cone antenna 1100. In this regard, the transceiver circuit 1250 may include a power amplifier 210 and a low-noise amplifier 310 at a front stage as shown in FIG. 2. Accordingly, the transceiver circuit 1250 may control the power amplifier 210 to radiate a signal amplified through the power amplifier 210 through the cone antenna 1100. Furthermore, the transceiver circuit 1250 may control the low noise amplifier 310 to amplify a signal received from the cone antenna 1100 through the low noise amplifier 310. In addition, the transceiver circuit 1250 may control elements inside the transceiver circuit 1250 to transmit and/or receive a signal through the cone antenna 1100.

In this regard, when the electronic device includes a plurality of cone antennas, the transceiver circuit 1250 may control a signal to be transmitted and/or received through at least one of the plurality of cone antennas. A case where the transceiver circuit 1250 transmits or receives a signal through only one cone antenna may be referred to as 1 Tx or 1 Rx, respectively. On the contrary, a case where the transceiver circuit 1250 transmits or receives a signal through two or more cone antennas may be referred to as n Tx or n Rx depending on the number of antennas.

For example, a case where the transceiver circuit 1250 transmits or receives a signal through two cone antennas may be referred to as 2 Tx or 2 Rx. However, a case where the transceiver circuit 1250 transmits or receives first and second signals having the same data through two cone antennas may be referred to as 1 Tx or 2 Rx. A case where the transceiver circuit 1250 transmits or receives the first and second signals having the same data through the two cone antennas as described above may be referred to as a diversity mode.

On the other hand, the metal patch 1101 may have a circular patch form as shown in FIG. 8A.

Furthermore, the metal patch 1101 may have a rectangular patch form as shown in FIG. 8B. In this regard, the metal patch 1101 may be implemented in a circular patch form or any polygonal patch form from the viewpoint of antenna downsizing and performance depending on the application. In this regard, any polygonal patch form may be approximated to a circular patch form as the order of the polygon increases.

Referring to FIG. 5A, the metal patch 1101 may be defined as a circular patch having an outer side shape in a circular form. Meanwhile, an inner side shape of the circular patch may be defined in a circular shape to correspond to a shape of an outer line of the upper aperture. Accordingly, a signal radiated from the cone antenna may be formed to be coupled through an inner side of the circular patch 1101, thereby having an advantage capable of optimizing the performance of the antenna.

Referring to FIG. 8B, the metal patch 1101' may be defined as a rectangular patch having an outer side shape in a rectangular form. On the other hand, an inner side shape of the rectangular patch may be defined in a circular shape to correspond to the shape of the outer line of the upper aperture. Accordingly, the signal radiated from the cone antenna may be formed to be coupled through an inner side of the rectangular patch 1101, thereby having an advantage capable of optimizing the performance of the antenna.

Figure 9A:
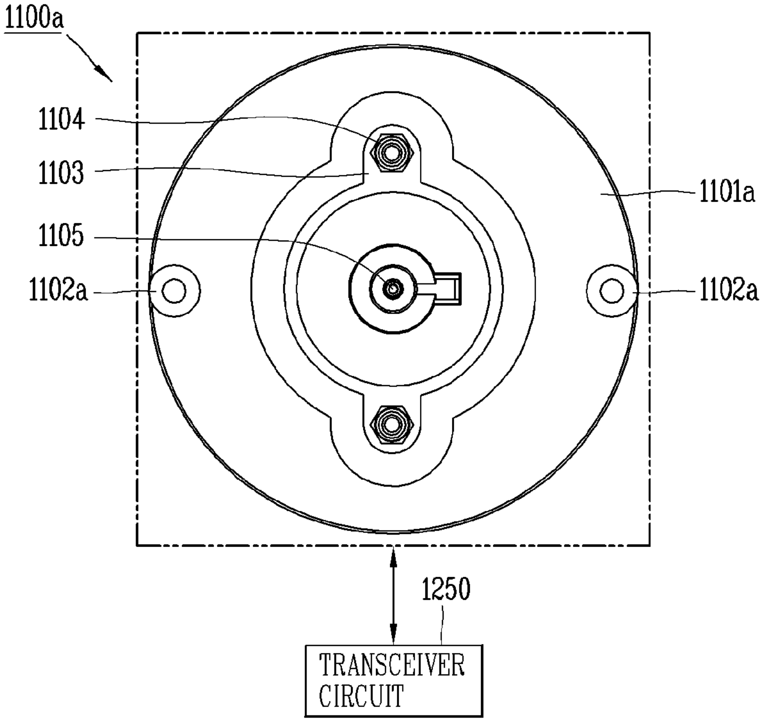
FIGS. 9A and 9B show front views of a cone antenna according to another embodiment of the present disclosure.
Figure 9B:
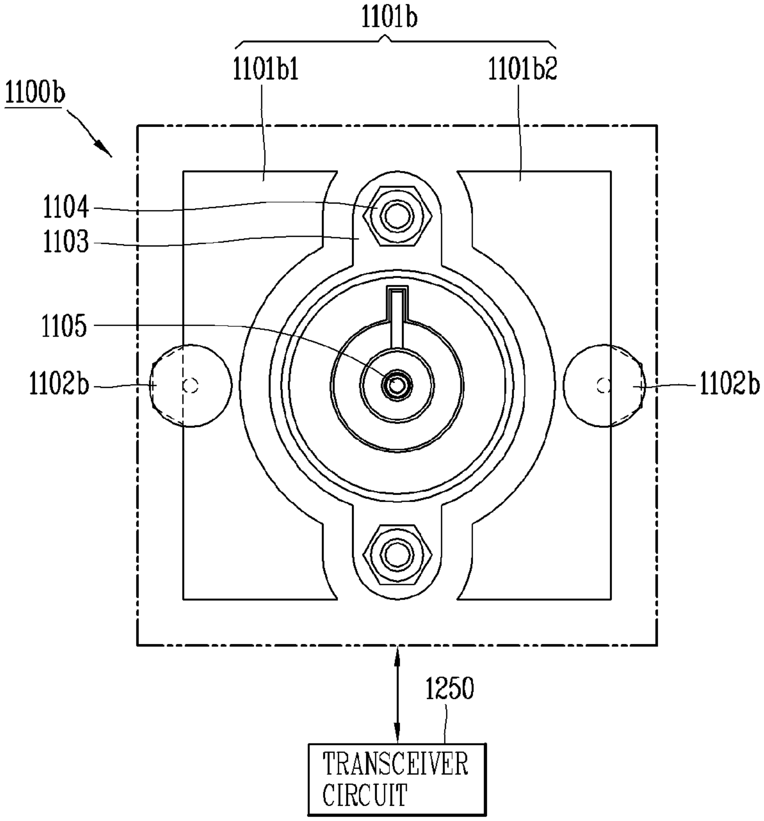

Meanwhile, FIGS. 9A and 9B show front views of a cone antenna including a circular patch and shorting pins according to another embodiment of the present disclosure. In other words, FIGS. 9A and 9B show a cone antenna implemented by one radiator and a single shorting pin. Here, when the metal patches 1101, 1101' are disposed at both sides of the cone radiator 1102 as shown in FIGS. 9A and 9B, the second metal patch may be disposed on the metal patches 1101, 1101' with a predetermined gap. In this regard, in the case of the circular patch 1101*a* in FIG. 9A, an inner side of the second metal patch 1101-2 may be defined in a circular shape to correspond thereto.

In FIG. 9A, the cone antenna 1100*a* may include a circular patch 1101*a* and two shorting pins 1102*a*. On the other hand, the cone antenna 1100*a* may connect the first substrate and the second substrate with two shorting pins 1102*a* and the remaining non-metal supporting pins.

In this regard, FIGS. 9A and 9B are views showing an electronic device provided with a cone antenna having a structure of a cone with two shorting pins according to an embodiment of the present disclosure. In this regard, the structure of a cone with two shorting pins is a cone antenna implemented by two shorting pins (or shorting supporters). Here, the structure of FIGS. 9A and 9B is not limited to the structure of a cone with two shorting pins, and may be a structure of a cone with a single shorting pin. In this regard, one of the two support structures may be implemented as a shorting pin and the other one as a non-metal supporter. Specifically, one of the shorting pins 1102*a* of FIG. 9A may be replaced with the non-metal supporter 1106 of FIG. 4A. Accordingly, one of the non-metal supporters 1106 may be disposed in a metal patch disposed on the other side.

Referring to FIGS. 9A and 9B, the electronic device according to the present disclosure includes the cone antenna 1100*a*. Furthermore, the electronic device may further include the transceiver circuit 1250.

Meanwhile, referring to FIGS. 4A to 9B, the cone antenna 1100*a* is disposed between a first substrate, which is an upper substrate, and a second substrate, which is a lower substrate. Meanwhile, the cone antenna 1100*a* may include a metal patch 1101*a* and the shorting pin 1102*a*. Here, the metal patch 1101*a* may be disposed in a surrounding region of the upper aperture of the cone antenna 1100*a*. In this regard, the metal patch 1101 may be disposed on the first substrate.

On the other hand, the metal patch 1101*a* may be implemented as a circular patch to surround the entire upper aperture of the cone antenna 1100*a*. However, the present disclosure is not limited thereto, and the metal patch 1101*a* may be implemented as a circular patch that surrounds a part of the upper aperture of the cone antenna 1100*a*. Accordingly, the circular patch may be disposed at both sides of the upper aperture of the cone antenna 1100*a* or may be disposed at one side thereof.

Accordingly, in the cone antenna 1100*a* according to the present disclosure, the circular patch 1101*a* may be disposed in an entire region to surround an entire region of the upper aperture of the cone antenna 1100*a*. Specifically, a metal patch such as the circular patch 1101*a* may be disposed at both one side and the other side corresponding to the one side so as to surround the entire region of the upper opening of the cone antenna.

Accordingly, the cone antenna 1100*a* having the symmetrical circular patch 1101*a* and the shorting pins 1102*a* may have a slightly increased overall size compared to a case where the metal patch disposed at only one side thereof is provided. However, the cone antenna 1100*a* having the symmetrical circular patch 1101*a* and the shorting pin 1102*a* has an advantage in that the radiation pattern is symmetrical and can be implemented with broadband characteristics.

On the other hand, in the cone antenna 1100*a* according to the present disclosure, the circular patch 1101*a* may be disposed in only a partial region to surround a partial region of the upper aperture. Accordingly, there is an advantage in that the size of the cone antenna 1100*a* including the metal patch 1101*a* can be minimized.

Specifically, the metal patch 1101*a* may be disposed in a surrounding region of the upper aperture of the cone antenna 1100*a*, and disposed above the first substrate. Accordingly, the metal patch 1101*a* may be disposed at a position spaced apart from the upper aperture of the cone antenna 1100*a* in the z-axis by a thickness of the first substrate. As such, when the metal patch 1101*a* is disposed above the first substrate, there is an advantage in that a size of the cone antenna 1100*a* can be further reduced. Specifically, since the first substrate having a predetermined dielectric constant is disposed in an upper region of the cone antenna 1100 including the metal patch 1101*a*, there is an advantage in that the size of the cone antenna 1100 can be further reduced.

Alternatively, the metal patch 1101 may be formed in a peripheral area of the upper aperture of the cone antenna 1100*a* and disposed under the first substrate. Accordingly, the metal patch 1101*a* may be spaced apart from the upper aperture of the cone antenna 1100*a* by a predetermined gap on the same plane on the z-axis. When the metal patch 1101*a* is disposed below the first substrate as described above, the first substrate may operate as a radome of the cone antenna 1100*a* including the metal patch 1101*a*. Accordingly, there is an advantage in that the cone antenna 1100*a* including the metal patch 1101*a* can be protected from the outside and a gain of the cone antenna 1100*a* can be increased.

The shorting pin 1102*a* is configured to connect between the metal patch 1101*a* and the ground layer GND disposed on the second substrate. As such, there is an advantage in that the size of the cone antenna 1100*a* can be reduced by the shorting pin 1102*a* configured to connect between the metal patch 1101*a* and the ground layer GND disposed on the second substrate.

The transceiver circuit 1250 may be connected to the cone antenna 1100*b* to control a signal to be radiated through the cone antenna 1100*b*.

Referring to FIG. 9A, the metal patch 1101*a* may be defined as a circular patch having an outer side shape in a circular form. Meanwhile, an inner side shape of the circular patch may be defined in a circular shape to correspond to a shape of an outer line of the upper aperture. Accordingly, a signal radiated from the cone antenna may be formed to be coupled through an inner side of the circular patch 1101*a*, thereby having an advantage capable of optimizing the performance of the antenna.

Meanwhile, a resonance length may be defined by an aperture of the metal patch 1101*a* having an aperture size larger than that of the upper aperture of the cone antenna. Accordingly, a signal radiated from the cone antenna 1100*a* may be coupled through an inner side of the circular patch 1101*a*. Accordingly, there is an advantage in that a size of the cone antenna 1100*a* can be reduced by the aperture of the circular patch 1101*a* having an aperture size larger than that of the upper aperture of the cone antenna.

On the other hand, FIG. 9B is a view showing an electronic device provided with a cone antenna having a structure of a cone with two shorting pins according to another embodiment of the present disclosure. In this regard, the structure of a cone with two shorting pins is a cone antenna implemented by two shorting pins (or shorting supporters). Here, the structure of FIGS. 9A and 9B is not limited to the structure of a cone with two shorting pins, and may be a structure of a cone with a single shorting pin. In this regard, one of the two support structures may be implemented as a shorting pin and the other one as a non-metal supporter. Specifically, one of the shorting pins 1102*b* of FIG. 6B may be replaced with the non-metal supporter 1106 of FIG. 4A. Accordingly, one of the non-metal supporters 1106 may be disposed in a metal patch 1101*b*1 on the other side.

Referring to FIG. 9B, the electronic device according to the present disclosure includes the cone antenna 1100*b*. Furthermore, the electronic device may further include the transceiver circuit 1250.

Meanwhile, referring to FIGS. 4 to 9B, the cone antenna 1100*b* is disposed between a first substrate, which is an upper substrate, and a second substrate, which is a lower substrate. Meanwhile, the cone antenna 1100*a* may include a metal patch 1101*b* and the shorting pins 1102*b*. Here, the metal patch 1101*b* may be disposed in a surrounding region of the upper aperture of the cone antenna 1100*b*. In this regard, the metal patch 1101 may be disposed on the first substrate.

On the other hand, the metal patch 1101*b* may be implemented as a rectangular patch to surround the entire upper aperture of the cone antenna 1100*b*. However, the present disclosure is not limited thereto, and the metal patch 1101*b* may be implemented as a rectangular patch that surrounds a part of the upper aperture of the cone antenna 1100*b*. Accordingly, the rectangular patch may be disposed at both sides of the upper aperture of the cone antenna 1100*b* or may be disposed at one side thereof.

Accordingly, in the cone antenna 1100*b* according to the present disclosure, the rectangular patch 1101*b* may be substantially disposed in an entire region to surround a region of the upper aperture of the cone antenna 1100*b*. In this regard, in order to reduce a size of the rectangular patch 1101*b*, the rectangular patch 1101*b* may not be disposed in a region around the fasteners 1104 supporting the cone antenna 1100*b*. Accordingly, the rectangular patches 1101*b* may be respectively disposed in left and right regions of the cone antenna 1100*b*.

In this regard, the metal patch 1101*b* may include a first metal patch 1101*b*1 and a second metal patch 1101*b*2. Specifically, the first metal patch 1101*b*1 may be disposed at a left side of the upper aperture of the cone antenna 1100*b* to surround the upper aperture. In addition, the second metal patch 1101*b*2 may be disposed at a right side of the upper aperture of the cone antenna 1100*b* to surround the upper aperture.

Accordingly, the first metal patch 1101*b* and the second metal patch 1101*b*2 are disposed to allow metal patterns thereof to be separated from each other, thereby reducing an overall size of the antenna. In this regard, when the first metal patch 1101*b* and the second metal patch 1101*b*2 are connected to each other, the metal patch 1101*b* may partially operate as a radiator. Accordingly, the bandwidth may be partially limited by an unwanted resonance due to the effect of the metal patch 1101*b* having a narrower bandwidth than the cone antenna 1100*b*.

In order to prevent such bandwidth limitation, the first metal patch 1101*b* and the second metal patch 1101*b*2 may be disposed to allow the metal patterns to be separated from each other. Accordingly, the cone antenna 1100*b* in which the metal patterns are separated from each other by the first metal patch 1101*b* and the second metal patch 1101*b*2 may operate as a broadband antenna. Accordingly, the first metal patch 1101*b* and the second metal patch 1101*b*2 may not be disposed in a region corresponding to the outer rim 1103 constituting the upper aperture.

Specifically, the rectangular patch 1101*b* may be disposed in a surrounding region of the upper aperture of the cone antenna 1100*b*, and disposed above the first substrate. Accordingly, the metal patch 1101*b* may be disposed at a position spaced apart from the upper aperture of the cone antenna 1100*b* in the z-axis by a thickness of the first substrate. As such, when the metal patch 1101*b* is disposed above the first substrate, there is an advantage in that a size of the cone antenna 1100*b* can be further reduced. Specifically, since the first substrate having a predetermined dielectric constant is disposed in an upper region of the cone antenna 1100 including the metal patch 1101*b*, there is an advantage in that the size of the cone antenna 1100*b* can be further reduced.

Alternatively, the rectangular patch 1101*b* may be disposed in a surrounding region of the upper aperture of the cone antenna 1100*b*, and disposed below the first substrate. Accordingly, the metal patch 1101*b* may be spaced apart from the upper aperture of the cone antenna 1100*b* by a predetermined gap on the same plane on the z-axis. When the metal patch 1101*b* is disposed below the first substrate as described above, the first substrate may operate as a radome of the cone antenna 1100*b* including the metal patch 1101*b*. Accordingly, there is an advantage in that the cone antenna 1100*b* including the metal patch 1101*b* can be protected from the outside and a gain of the cone antenna 1100*b* can be increased.

The shorting pins 1102*b* are configured to connect between the metal patch 1101*a* and the ground layer GND disposed on the second substrate. As such, there is an advantage in that the size of the cone antenna 1100*a* can be reduced by the shorting pin 1102*a* configured to connect between the metal patch 1101*a* and the ground layer GND disposed on the second substrate.

The transceiver circuit 1250 may be connected to the cone antenna 1100*b* to control a signal to be radiated through the cone antenna 1100*b*. The detailed description related thereto will be replaced with the description in FIG. 8.

Referring to FIG. 9B, the rectangular patch 1101*b* may be defined as a rectangular patch having an outer side shape in a rectangular form. Meanwhile, an inner side shape of the rectangular patch may be defined in a circular shape to correspond to a shape of an outer line of the upper aperture. Accordingly, the signal radiated from the cone antenna may be formed to be coupled through an inner side of the rectangular patch 1100*b*, thereby having an advantage capable of optimizing the performance of the antenna.

Meanwhile, a resonance length may be defined by a circular aperture of the rectangular patch 1101*b* having an aperture size larger than that of the upper aperture of the cone antenna. Accordingly, a signal radiated from the cone antenna 1100*b* may be coupled through an inner side of the rectangular patch 1101*b*. Accordingly, there is an advantage in that a size of the cone antenna 1100*b* can be reduced by the aperture of the rectangular patch 1101*b* having an aperture size larger than that of the upper aperture of the cone antenna.

On the other hand, the plurality of outer rims 1103 configured integrally with the cone radiator 1100R inside the metal patches 1101, 1101', 1101*a*, 1101*b* and the fasteners 1104 in the structure of FIGS. 8A to 9B may be configured in the same structure as in FIGS. 4A to 9B. Accordingly, the plurality of outer rims 1103 and fasteners 1104 configured integrally with the cone radiator 1100R may be configured to be three or greater, and preferably to be six. Accordingly, bandwidth characteristics in the low frequency band may be improved.

Figure 10A:
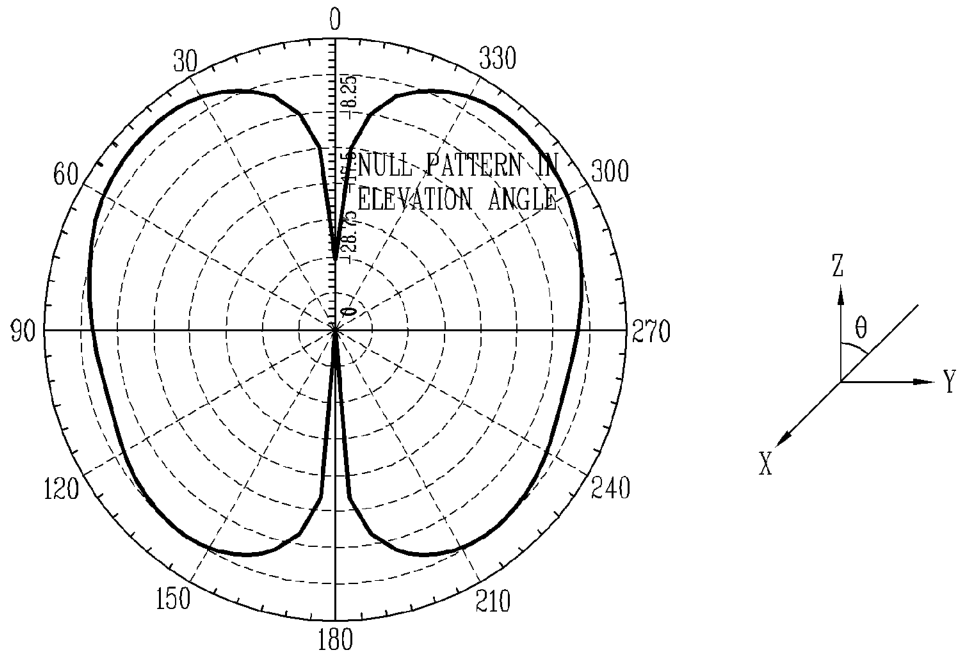
FIG. 10A shows a radiation pattern for a symmetrical structure such as a cone antenna provided with two shorting pins. On the other hand.

On the other hand, the electronic device having the cone antenna according to the present disclosure has excellent reception performance in almost all directions through the cone antenna. Specifically, a radiation pattern of the cone antenna has excellent reception performance even from boresight in the elevation angle direction. In this regard, FIG. 10A shows a radiation pattern for a symmetrical structure such as a cone antenna provided with two shorting pins. On the other hand, FIG. 10B shows a radiation pattern for a structure such as a cone antenna provided with a single shorting pin.

Referring to FIG. 10A, a cone antenna having two shorting pins has a problem in that a null of the radiation pattern is generated from boresight in an elevation angle direction, thereby deteriorating reception performance. In order to solve this problem, in the present disclosure, the null of the radiation pattern may be removed from boresight in the elevation angle direction through a structure in which the cone antenna 1110 is connected to a single shorting pin 1102. In this regard, referring to FIG. 9A, the cone antenna with a single shorting pin forms a current path of the power feeder 1105—the cone radiator 1100R—the metal patch 1101—the shorting pin 1102—the ground layer GND. In this way, through an asymmetric current path of the power feeder 1105—the cone radiator 1100R—the metal patch 1101—the shorting pin 1102—the ground layer GND, a null of the radiation pattern may be prevented from being generated from boresight in the elevation angle direction.

Figure 10B:
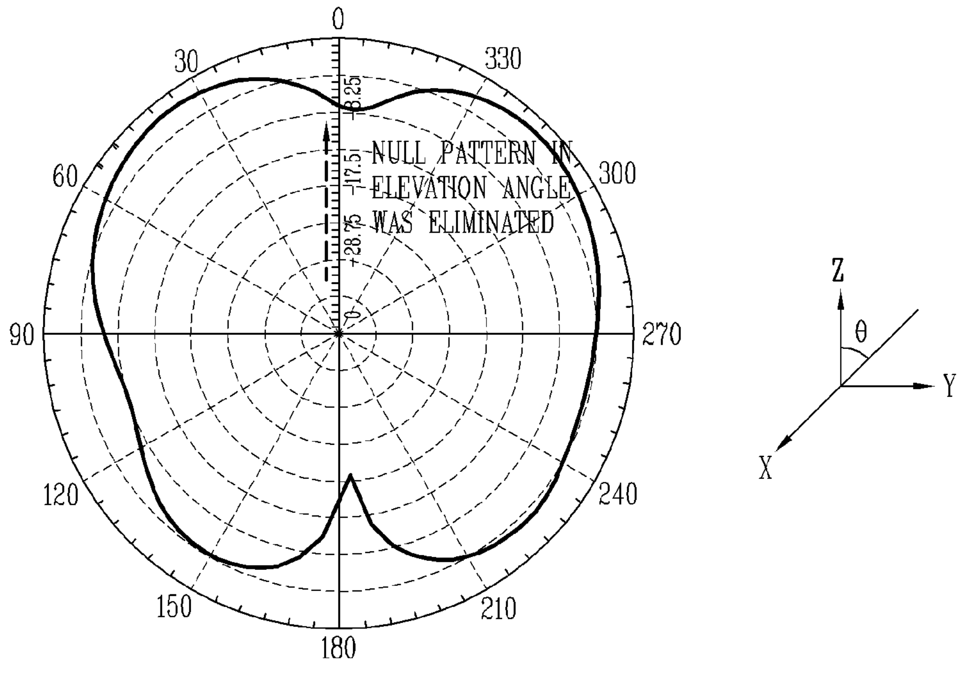
FIG. 10B shows a radiation pattern for a structure such as a cone antenna provided with a single shorting pin.

Referring to FIG. 10B, in the cone antenna having a single shorting pin, the null of the radiation pattern may be removed from boresight in the elevation angle direction. Accordingly, the present disclosure has an advantage in that reception performance can be improved in almost all directions.

In the above, an electronic device employing an antenna structure having two or more cone radiators inside the metal patch 1101 according to an aspect of the present disclosure has been described. Hereinafter, a vehicle employing an antenna structure having two or more cone radiators inside the metal patch 1101 according to another aspect of the present disclosure will be described. In this regard, the foregoing description of the hybrid cone antenna 1100 having a plurality of metal patches may also be applied to a vehicle having a hybrid cone antenna having a plurality of metal patches.

Figure 11A:
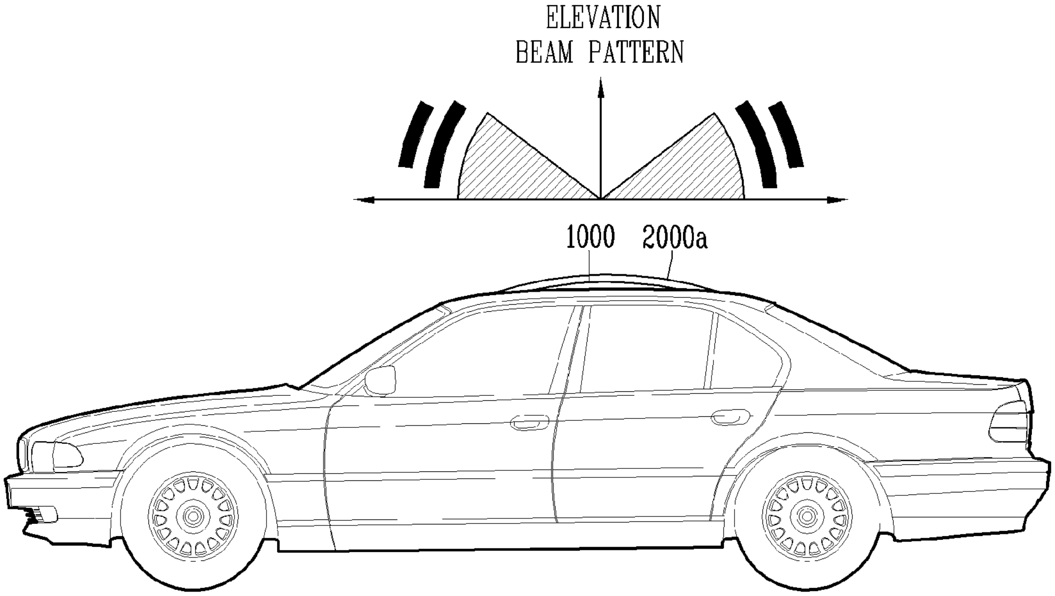
FIGS. 11A and 11B show a structure in which an antenna system can be mounted in a vehicle including the antenna system mounted on the vehicle according to the present disclosure.
Figure 11B:
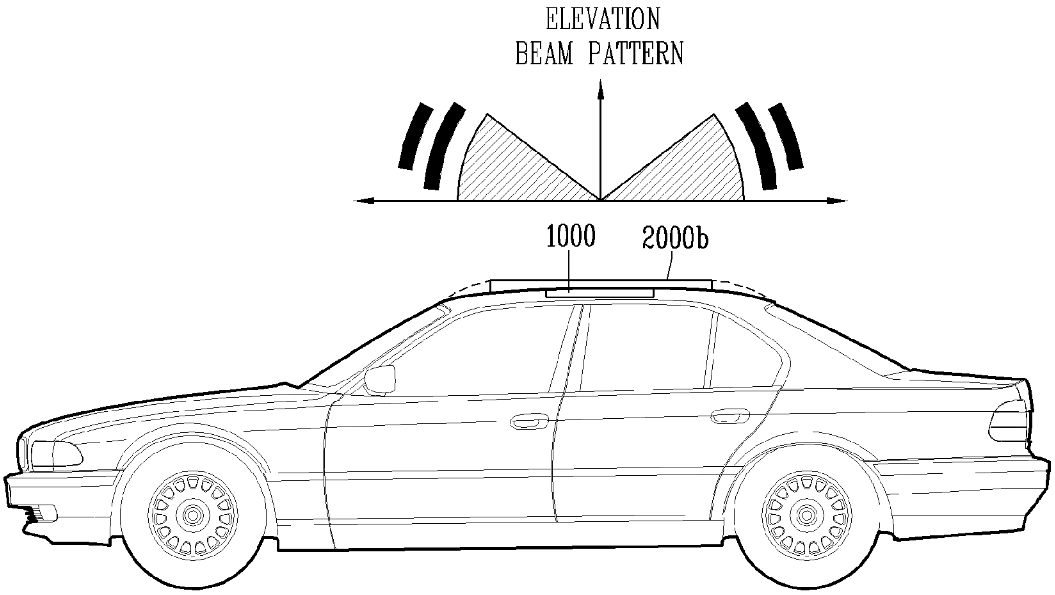

FIGS. 11A and 11B show a structure in which an antenna system can be mounted in a vehicle including the antenna system mounted on the vehicle according to the present disclosure. In this regard, FIG. 11A illustrates a configuration in which an antenna system 1000 is mounted inside a roof of a vehicle. In this regard, a case in which the antenna system 1000 is mounted on the roof of the vehicle may also be included therein. Meanwhile, the antenna system 1000 may be mounted inside the roof of the vehicle and a roof frame of a rear mirror.

Referring to FIGS. 11A and 11B, in the present disclosure, in order to improve an appearance of an automobile (vehicle) and preserve telematics performance in case of a collision, a shark fin antenna in the related art will be replaced with a non-protruding flat antenna. In addition, the present disclosure intends to propose an antenna in which an LTE antenna and a 5G antenna are integrated in consideration of 5G communication along with the provision of the mobile communication service (LTE) in the related art.

Referring to FIGS. 11A and 11B, the antenna system 1000 is configured as a structure, and disposed on a roof of a vehicle. A radome 2000*a* for protecting the antenna system 1000 from an external environment and an external impact while driving a vehicle may surround the antenna system 1000. The radome 2000*a* may be made of a dielectric material through which a radio wave signal transmitted and received between the antenna system 1000 and a base station can be transmitted.

Referring to FIG. 11A, the antenna system 1000 may be disposed inside a roof structure of a vehicle, and may be configured such that at least part of the roof structure is implemented with a non-metal. In this case, at least part of the roof structure 2000*a* of the vehicle may be implemented with a non-metal, and made of a dielectric material through which a radio signal transmitted and received between the antenna system 1000 and the base station can be transmitted.

Furthermore, referring to FIG. 11B, the antenna system 1000 may be disposed inside a roof frame of a vehicle, and at least part of the roof frame may be configured to be implemented with a non-metal. In this case, at least part of the roof frame 2000*b* of the vehicle may be made of a non-metal, and may be made of a dielectric material through which a radio signal transmitted and received between the antenna system 1000 and the base station may be transmitted.

Figure 12:
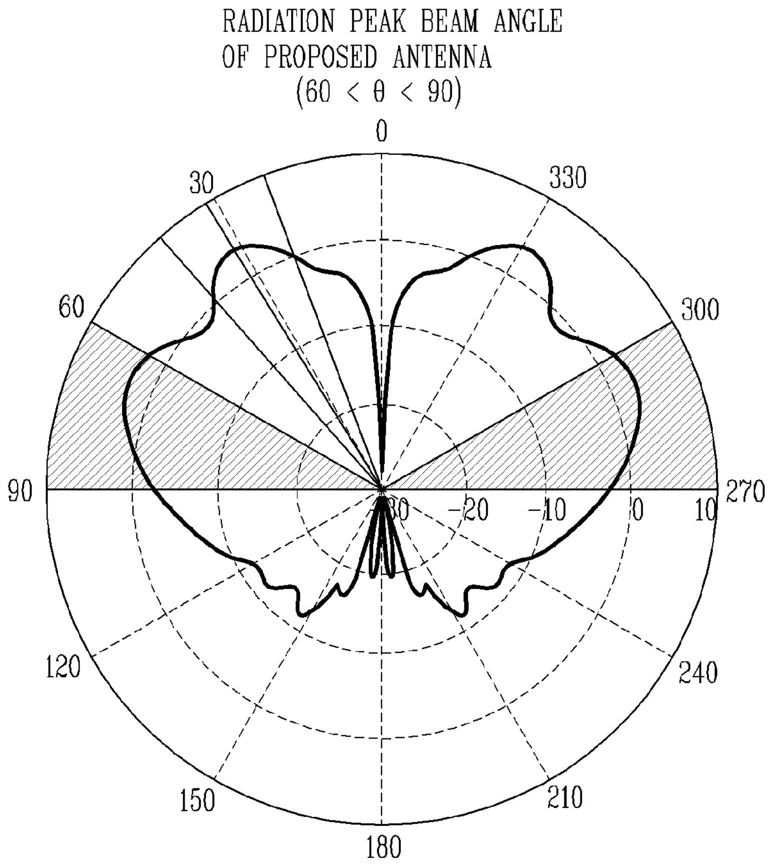
FIG. 12 shows an example of a radiation pattern of a vehicle having a cone antenna with a multi-cone structure in which a plurality of shorting pins are symmetrically provided according to the present disclosure.

Meanwhile, referring to FIGS. 11A and 11B, it may not be important for the vehicle to transmit or receive a signal through boresight in the elevation angle direction. In this regard, the vehicle needs to transmit and/or receive a signal only in a predetermined angular section, for instance, at 30 degrees, in a horizontal direction other than in a vertical direction in the elevation angle direction. In this regard, FIG. 11 shows an example of a radiation pattern of a vehicle having a hybrid cone antenna in which a plurality of shorting pins according to the present disclosure have a plurality of metal patches in a symmetrical form. Referring to FIGS. 11A, 11B and 12, a radiation pattern may be mainly formed in the relevant region to allow the vehicle to transmit and/or receive a signal only in a predetermined angular section, for instance, 30 degrees, in a horizontal direction other than in a vertical direction in the elevation angle direction.

In this regard, a hybrid cone antenna having a plurality of metal patches according to the present disclosure may be configured with a plurality of shorting pins, thereby implementing symmetry of electrical properties in various directions along with structural stability. In this regard, when a plurality of shorting pins are disposed at predetermined angular intervals, the current distribution of the hybrid cone antenna having the plurality of metal patches is symmetrically formed. Accordingly, there is an advantage in that mobility, in particular, symmetry of electrical characteristics in various directions can be maintained even when changing directions in an electronic device or vehicle provided with a hybrid cone antenna having a plurality of metal patches. In this regard, when the plurality of shorting pins are symmetrically disposed, a null of the radiation pattern may be generated from boresight in the elevation angle direction. Therefore, in the case of a vehicle, it may not be important to transmit or receive a signal through boresight in the elevation angle direction. In this regard, referring to FIGS. 11A, 11B and 12, a radiation pattern may be mainly formed in the relevant region to allow the vehicle to transmit and/or receive a signal only in a predetermined angular section, for instance, 30 degrees, in a horizontal direction other than in a vertical direction in the elevation angle direction.

Figure 13A:
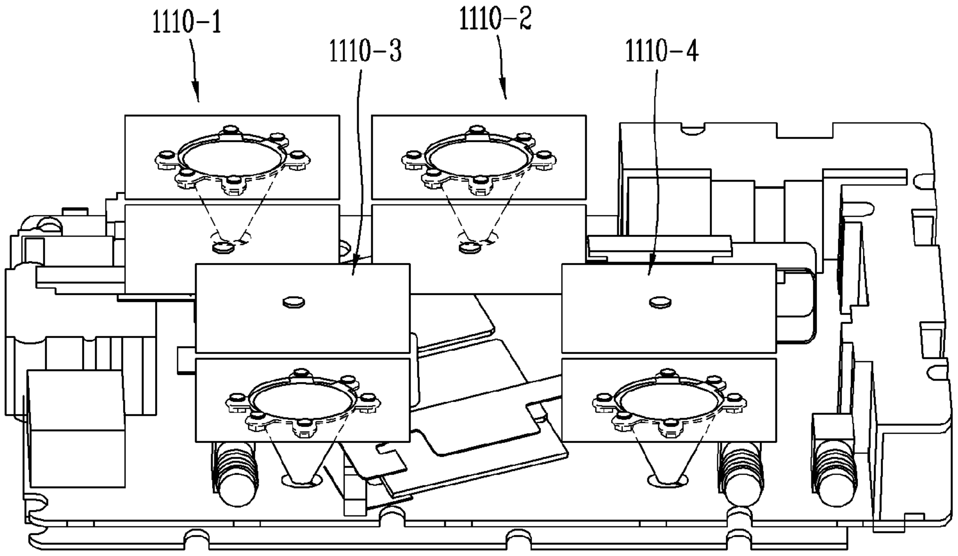
FIG. 13A shows a shape of an electronic device or vehicle having a plurality of cone antennas according to the present disclosure.
Figure 13B:
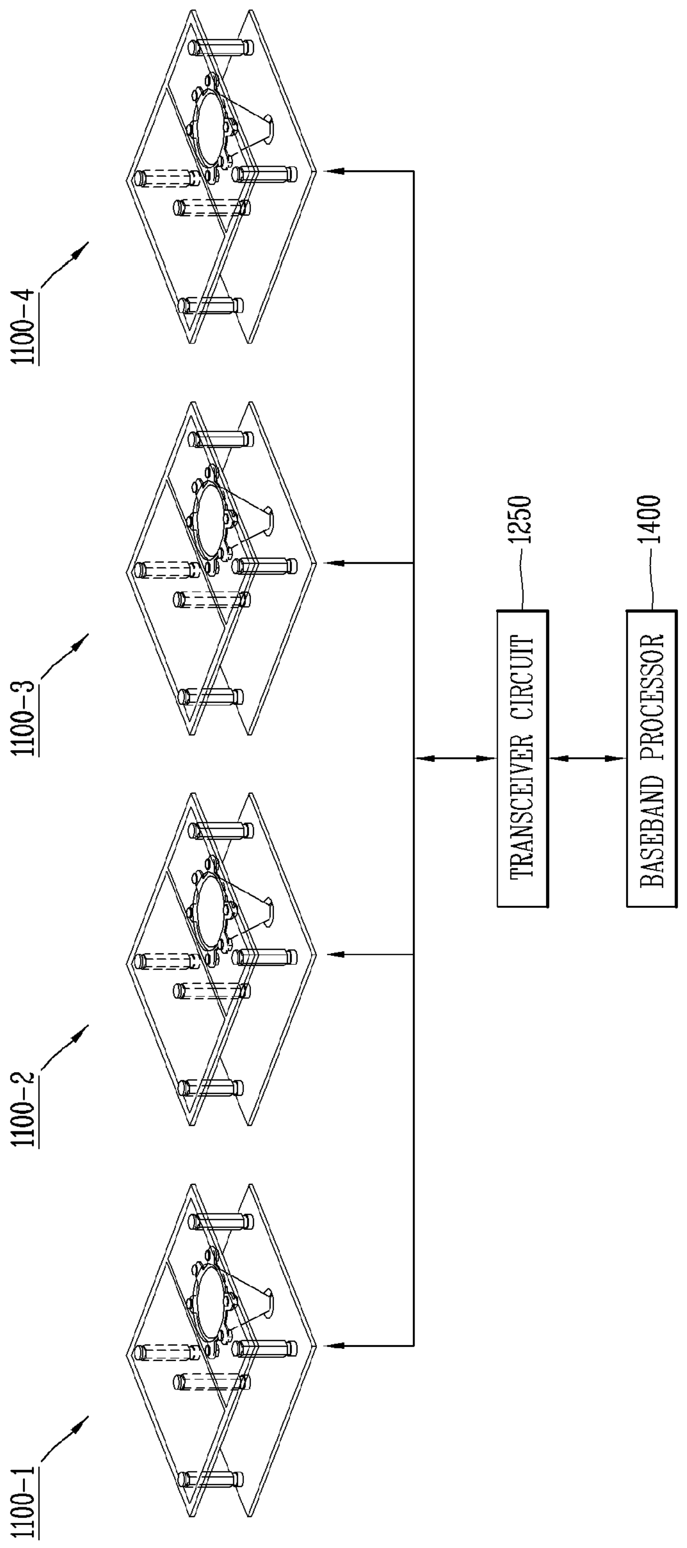
FIG. 13B shows a structure of an electronic device having a plurality of cone antennas, a transceiver circuit, and a processor according to the present disclosure.

The antenna system may be implemented as an antenna system including a plurality of cone antennas in an electronic device or vehicle having a hybrid cone antenna provided with a plurality of metal patches. In this regard, FIG. 13A shows a shape of an electronic device or vehicle having a plurality of cone antennas according to the present disclosure. Furthermore, FIG. 13B shows a structure of an electronic device having a plurality of cone antennas, a transceiver circuit, and a processor according to the present disclosure.

Referring to FIG. 13A, the electronic device or vehicle may include four cone antennas, that is, a first cone antenna 1100-1 to a fourth cone antenna 1100-4. Here, the number of cone antennas can be changed to various numbers according to applications. Here, the first cone antenna 1100-1 to the fourth cone antenna 1100-4 may be implemented in the same shape for the same antenna performance. In addition, the first cone antenna 1100-1 to the fourth cone antenna 1100-4 may be implemented in different shapes for optimal antenna performance and an optimal arrangement structure.

Here, the electronic device may be implemented in a communication relay apparatus, a small cell base station, a base station, or the like in addition to a user terminal (UE). Here, the communication relay apparatus may be customer premises equipment (CPE) capable of providing a 5G communication service indoors. Furthermore, the vehicle may be configured to communicate with a 4G base station or a 5G base station, or may be configured to communicate with an adjacent vehicle directly or via a peripheral device.

On the other hand, a vehicle having a cone antenna provided with a plurality of metal patches according to the present disclosure will be described as follows with reference to FIGS. 4A to 13B. In this regard, the foregoing description of a cone antenna having a plurality of metal patches may also be applied to a vehicle having a cone antenna having a plurality of metal patches. In this regard, a vehicle 300 is provided with the antenna system 1000 configured with a cone antenna. Here, the antenna system 1000 may include an antenna in which a plurality of cone antennas are arranged instead of the cone antenna. Furthermore, the antenna system 1000 may include an antenna in which a plurality of cone antennas are arranged, a transceiver circuit connected thereto, and a baseband processor.

The vehicle 300 having a hybrid cone antenna provided with a plurality of metal patches may include the antenna system 1000 including the first and second metal patches 1101-1, 1101-2 and the cone radiator 1100R. Meanwhile, the antenna system 1000 provided in the vehicle 300 may further include the power feeder 1105.

In this regard, the cone radiator 1100R is disposed to connect the first substrate S1 and the second substrate S2 spaced apart from the first substrate S1 by a predetermined gap. In this regard, the cone radiator 1100R may include an upper aperture coupled to the first substrate S1 and a lower aperture coupled to the second substrate S2.

Meanwhile, the first metal patch 1101-1 is disposed on a front or rear surface of the first substrate S1, and disposed to be spaced apart from the upper aperture. In addition, the power feeder 1105-1 is disposed on the second substrate S2, and configured to transmit a first signal to the first cone radiator 1100R through the lower aperture.

On the other hand, the antenna system 1000 disposed in the vehicle includes a plurality of cone antennas, for example, the first cone antenna 1100-1 to the fourth cone antenna 1100-4. Specifically, the antenna system 1100 may be implemented with a plurality of cone antennas, that is, the first to fourth cone antennas 1100-1 to 1100-4, disposed on an upper left portion, an upper right portion, a lower left portion, and a lower right portion of the antenna system 1100 in the vehicle. In this regard, the plurality of cone antennas 1100-1 to 1100-4 may include the metal patches 1101-1, 1101-2, the cone radiators 1100R, and the power feeders 1105.

Furthermore, the antenna system 1000 disposed in the vehicle may further include the transceiver circuit 1250. In addition, the antenna system 1000 disposed in the vehicle may further include a processor 1400. Here, the processor 1400 may be a baseband processor configured to control the transceiver circuit 1250.

In this regard, the transceiver circuit 1250 is connected to the cone radiators 1100R through the power feeders 1105, respectively. Furthermore, the transceiver circuit 1250 may control a first signal in a first frequency band to be radiated through the cone antenna 1110. In addition, the transceiver circuit 1250 may control a second signal in a second frequency band lower than the first frequency band to be radiated through the cone antenna 1110.

In this regard, the processor 1400 may control the transceiver circuit 1250 to perform multi-input multi-output (MIMO) through two or more of the plurality of cone antennas 1100-1 to 1100-4.

When a resource of the first frequency band is allocated to the vehicle, the processor 1400 controls the transceiver circuit to perform multi-input multi-output (MIMO) through two or more of the plurality of cone antennas 1100-1 to 1100-4. To this end, when the resource of the first frequency band is allocated to the vehicle, the processor 1400 may control the transceiver circuit 1250 to operate in the first frequency band. In this regard, the processor 1400 may inactivate a partial configuration of the transceiver circuit 1250 operating in the second frequency band.

On the contrary, when a resource of the first frequency band is allocated to the vehicle, the processor 1400 controls the transceiver circuit to perform multi-input multi-output (MIMO) through two or more of the plurality of cone antennas 1100-2 to 1100-4. To this end, when the resource of the second frequency band is allocated to the vehicle, the processor 1400 may control the transceiver circuit 1250 to operate in the second frequency band. In this regard, the processor 1400 may inactivate some components of the transceiver circuit 1250 operating in the second frequency band.

On the other hand, when both the resource of the first frequency band and the resource of the second frequency band are allocated to the vehicle, the processor 1400 may use only one cone antenna. To this end, the processor 1400 may control the transceiver circuit 1250 to perform carrier aggregation (CA) on the first signal and the second signal received through one cone antenna. Accordingly, the processor 1400 may simultaneously acquire both the first and second information included in the first and second signals, respectively.

Meanwhile, each of the antennas 1100-1 to 1100-4 of the antenna system 1000 disposed in the vehicle may further include a shorting pin 1102 disposed to electrically connect the second metal patch 1101-2 and the ground layer GND of the second substrate S2. In this case, the shorting pin 1102 may be configured with a single shorting pin between the second metal patch 1101-2 and the second substrate S2. As described above, a null of a radiation pattern may be prevented from being generated in the elevation angle direction of the cone antenna by a single shorting pin.

Alternatively, the shorting pin 1102 may be configured with a plurality of shorting pins between the second metal patch 1101-2 and the second substrate S2. As described above, a null of the radiation pattern may be generated in the elevation angle direction of the cone antenna by the plurality of shorting pins, but this is not a problem in the case of a vehicle.

On the other hand, an end portion of the power feeder 1105 may be defined in a ring shape to correspond to a shape of the lower aperture. In this case, the cone antenna may further include a fastener 1107 configured to be connected to the second substrate S2 through an inside of an end portion of the power feeder 1105. As such, the second substrate S2 on which the power feeder is disposed and the cone radiator 1100R may be fixed through the fastener 1107.

Meanwhile, the metal patch 1100-1 may be disposed at only one side to surround a partial region of the upper opening of the cone antenna, thereby minimizing a size of the cone antenna including the metal patch 1100-1. In this regard, the metal patch 1101 may be disposed at only one side of the upper opening as shown in FIG. 8B. In this case, the shorting pin 1102 may not be disposed inside the metal patch 1101, but a single shorting pin 1102 may be disposed only inside the second metal patch 1101-2. In this regard, the metal patch 1101 may be disposed to be spaced apart from the second metal patch 1101-2 by a predetermined distance so as to be coupled thereto as shown in FIGS. 4A to 5.

On the other hand, an arrangement structure of a plurality of cone antennas and a signal transceiving method through the arrangement structure are as follows. In this regard, the cone antennas 1100-1 to 1100-4 may be disposed on an upper left, an upper right, a lower left, and a lower right of the electronic device. The arrangement form of the cone antennas 1100-1 to 1100-4 is preferably configured to maximize a separation distance between the cone antennas in the electronic device. Accordingly, mutual interference between the cone antennas 1100-1 to 1100-4 is minimized, which is advantageous in a multi-input multi-output (MIMO) or diversity operation.

In the above, an electronic device or vehicle having a cone antenna according to the present disclosure has been described. The technical effects of an electronic device or vehicle having such a cone antenna will be described as follows.

According to the present disclosure, there is an advantage capable of providing a cone antenna having a plurality of metal patches operating in a wide frequency band from a low frequency band to a 5G sub-6 band.

Furthermore, according to the present disclosure, a cone radiator operating from a low frequency band to a 5G sub-6 band is optimally disposed with a plurality of metal patches and shorting pins in an electronic device or vehicle, thereby having an advantage capable of optimizing antenna performance.

In addition, according to the present disclosure, there is an advantage capable of providing an electronic device or vehicle that operates in a wide band from a low frequency band to a 5 GHz band through a structure in which the cone radiator is connected to the metal patches and coupled between the plurality of metal patches.

Moreover, according to the present disclosure, the metal patches may rotate by a predetermined angle with respect to the cone radiator while the cone radiator and the metal patches are optimally disposed, thereby minimizing an overall antenna size.

Furthermore, according to the present disclosure, metal patches with various shapes may be disposed around an upper aperture of the cone antenna, thereby having an advantage capable of providing a broadband antenna with an optimal structure according to the operating frequency and design conditions of the antenna.

Furthermore, according to the present disclosure, a region where the metal patch is disposed in an upper region of the cone antenna and the number of shorting pins may be optimized, thereby having an advantage capable of optimizing the characteristics of the antenna as well as minimizing the overall size of the antenna.

Further scope of applicability of the present disclosure will become apparent from the following detailed description. It should be understood, however, that the detailed description and specific examples, such as the preferred embodiment of the disclosure, are given by way of illustration only, since various changes and modifications within the spirit and scope of the disclosure will be apparent to those skilled in the art.

In relation to the aforementioned present disclosure, design and operations of a plurality of cone antennas and a configuration for controlling those antennas can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller of the terminal. Therefore, it should also be understood that the above-described embodiments are not limited by any of the details of the foregoing description, unless otherwise specified, but rather should be construed broadly within its scope as defined in the appended claims. Therefore, all changes and modifications that fall within the metes and bounds of the claims, or equivalents of such metes and bounds are therefore intended to be embraced by the appended claims.

What is claimed is:

1. An antenna system, comprising:

a cone antenna comprising:

a first substrate;

a second substrate spaced apart from the first substrate by a predetermined gap and provided with a ground layer;

a cone radiator provided between the first substrate and the second substrate, an upper part of which is connected to the first substrate, a lower part of which is connected to the second substrate, and provided with an aperture at the upper part;

a metal patch disposed on the first substrate, and disposed to surround the upper aperture of the cone antenna;

a second metal patch spaced apart from the metal patch by a predetermined distance to be electromagnetically coupled to the metal patch; and a shorting pin disposed to electrically connect the second metal patch and the ground layer of the second substrate;

a plurality of outer rims configured to constitute the upper aperture of the cone antenna and to connect the cone antenna to the first substrate;

a plurality of fasteners configured to connect the outer rims and the first substrate; and a transceiver circuit connected to the cone radiator through a power feeder to control a signal to be radiated through the cone antenna, wherein a number of the plurality of outer rims and a number of the plurality of fasteners are configured to be three or greater to form multi-resonance of the cone antenna in a low frequency band.

2. The antenna system of claim 1, wherein the first metal patch and the second metal patch are disposed in a state of being rotated by a predetermined angle with respect to the cone radiator to minimize an overall size of a hybrid cone antenna including the cone radiator, the first metal patch, and the second metal patch.

3. The antenna system of claim 1, wherein a separation angle between the plurality of outer rims with respect to the center of the cone radiator is defined to be substantially the same as each other, and the number of the plurality of outer rims and the number of the plurality of fasteners are each configured to be six.

4. The antenna system of claim 1, wherein the metal patch and the second metal patch are disposed on a bottom surface of the first substrate.

5. The antenna system of claim 4, further comprising:

a stack patch and a second stack patch spaced apart from the stack patch on a front surface of the first substrate, wherein the stack patch and the second stack patch are each disposed in an upper region of the metal patch and the second metal patch.

6. The antenna system of claim 1, wherein the shorting pin is defined as a single shorting pin vertically connected between the second metal patch and the second substrate, and a null of a radiation pattern of the cone antenna is prevented from being generated by the single shorting pin.

7. An antenna system comprising:

a cone antenna comprising:

a first substrate;

a second substrate spaced apart from the first substrate by a predetermined gap and provided with a ground layer;

a cone radiator provided between the first substrate and the second substrate, an upper part of which is connected to the first substrate, a lower part of which is connected to the second substrate, and provided with an aperture at the upper part;

a metal patch disposed on the first substrate, and disposed to surround the upper aperture of the cone antenna;

a second metal patch spaced apart from the metal patch by a predetermined distance to be electromagnetically coupled to the metal patch; and a shorting pin disposed to electrically connect the second metal patch and the ground layer of the second substrate; and a transceiver circuit connected to the cone radiator through a power feeder to control a signal to be radiated through the cone antenna, wherein the shorting pin is a single shorting pin disposed to vertically connect the second metal patch, the second stack patch disposed at an upper part of the second metal patch, and the second substrate, and a null of a radiation pattern of the cone antenna is prevented from being generated by the single shorting pin.

8. The antenna system of claim 1, further comprising:

the power feeder disposed on the second substrate, and configured to transmit the signal through a lower aperture, wherein an end portion of the power feeder is defined in a ring shape to correspond to a shape of the lower aperture.

9. The antenna system of claim 8, further comprising:

a fastener configured to be connected to the second substrate through an inside of the end portion of the power feeder, wherein the second substrate on which the power feeder is disposed and the cone radiator are fixed through the fastener.

10. The antenna system of claim 1, wherein a dielectric region or slot region having a diameter greater than that of the upper aperture is provided inside the metal patch, and the slot region is disposed to surround the upper aperture of the cone radiator so as to allow an electric field from the upper aperture of the cone radiator to be coupled to an inner side of the metal patch.

11. The antenna system of claim 10, further comprising:

a stack patch and a second stack patch spaced apart from the stack patch on a front surface of the first substrate, wherein a dielectric region or a second slot region having a diameter greater than that of the upper opening is provided inside the stack patch.

12. The antenna system of claim 1, further comprising:

at least one non-metal supporter configured to vertically connect the first substrate and the second substrate so as to support the first substrate and the second substrate, wherein at least one of the non-metal supporters is disposed to connect the metal patch and the second substrate, another one of the non-metal supporters is disposed to connect the second metal patch and the second substrate, and a null of a radiation pattern of the cone antenna is prevented from being generated by a single shorting pin disposed on the second metal patch.

13. The antenna system of claim 1, wherein the metal patch is disposed as a rectangular patch having an outer side shape in a rectangular form, and an inner side shape of the rectangular patch is defined in a circular shape to correspond to a shape of an outer line of the upper aperture so as to allow a signal radiated from the cone antenna to be coupled through an inner side of the rectangular patch.

14. A vehicle having an antenna, the vehicle comprising:

a cone antenna comprising:

a cone radiator disposed to connect a first substrate and a second substrate spaced apart from the first substrate by a predetermined gap, and provided with an upper aperture and a lower aperture;

a metal patch disposed on the first substrate, and disposed to surround the upper aperture of the cone antenna;

a second metal patch spaced apart from the metal patch by a predetermined distance to be electromagnetically coupled to the metal patch; and a power feeder disposed on the second substrate, and configured to transmit a signal through the lower aperture;

a transceiver circuit connected to the cone radiator through the power feeder to control a signal to be radiated through the cone antenna; and a processor that controls an operation of the transceiver circuit, and wherein the cone antenna is implemented with a plurality of cone antennas disposed on an upper left, an upper right, a lower left and a lower right of the vehicle, and wherein the processor controls the transceiver to perform multi-input multi-output (MIMO) through the plurality of cone antennas.

15. The vehicle of claim 14, further comprising:

a shorting pin that connects between the second metal patch and a ground layer of the second substrate, wherein an end portion of the power feeder is defined in a ring shape to correspond to a shape of the lower aperture.

16. The vehicle of claim 15, wherein the shorting pin is defined as a single shorting pin between the second metal patch and the second substrate, and a null of a radiation pattern of the cone antenna is prevented from being generated by the single shorting pin.

17. The vehicle of claim 14, further comprising:

a fastener configured to be connected to the second substrate through an inside of the end portion of the power feeder, wherein the second substrate on which the power feeder is disposed and the cone radiator are fixed through the fastener.

18. The vehicle of claim 14, wherein the metal patch is disposed only at one side so as to surround a partial region of an upper opening of the cone antenna to minimize a size of the cone antenna including the metal patch.

* * * * *